United States Patent [19]

Minai et al.

[11] Patent Number: 5,013,479

[45] Date of Patent: May 7, 1991

[54] OPTICALLY ACTIVE ETHER DERIVATIVES, PREPARATION PROCESS THEREFOR, LIQUID CRYSTAL MATERIALS AND AN OPTICAL SWITCHING ELEMENT

[75] Inventors: Masayoshi Minai, Moriyama; Takayuki Higashii, Kishiwada, both of Japan

[73] Assignees: Sumitomo Chemical Company, Limited, Osaka; Hitachi, Ltd., Tokyo, both of Japan

[21] Appl. No.: 512,523

[22] Filed: Apr. 18, 1990

Related U.S. Application Data

[63] Continuation of Ser. No. 201,877, Jun. 3, 1988, abandoned.

[30] Foreign Application Priority Data

Jun. 10, 1987 [JP] Japan ................ 62-145469
Mar. 22, 1988 [JP] Japan ................ 63-68449

[51] Int. Cl.$^5$ ........................... C09K 19/12
[52] U.S. Cl. .................. 252/299.65; 350/350 S; 252/299.01; 252/299.67; 560/59; 560/73; 560/102; 560/108; 560/109
[58] Field of Search ............ 350/350 S; 252/299.01, 252/299.65, 299.67; 560/59, 73, 102, 108, 109

[56] References Cited

U.S. PATENT DOCUMENTS

| | | | |
|---|---|---|---|
| 4,556,727 | 12/1985 | Walba ............................. | 252/299.67 |
| 4,564,694 | 1/1986 | Hirai et al. ...................... | 252/299.67 |
| 4,812,259 | 3/1989 | Yoshinaga et al. ............ | 252/299.01 |
| 4,834,907 | 5/1989 | Inoue et al. .................... | 560/73 |
| 4,882,085 | 11/1989 | Yoshinaga et al. ............ | 560/59 |
| 4,911,861 | 3/1990 | Higuchi et al. ................. | 560/59 |

FOREIGN PATENT DOCUMENTS

| | | |
|---|---|---|
| 0175591 | 3/1986 | European Pat. Off. |
| 255219 | 2/1988 | European Pat. Off. |
| 270244 | 6/1988 | European Pat. Off. |
| 36-063633 | 4/1961 | Japan |
| 59-219251 | 12/1984 | Japan |
| 60-149547 | 8/1985 | Japan |
| 60-149548 | 8/1985 | Japan |
| 61-000043 | 1/1986 | Japan |
| 61-022051 | 1/1986 | Japan |
| 61-165350 | 7/1986 | Japan |
| 61-210056 | 9/1986 | Japan |
| 62-000046 | 1/1987 | Japan |
| 62-198647 | 9/1987 | Japan |
| 63/172788 | 7/1988 | Japan |
| 87/05012 | 8/1987 | World Int. Prop. O. |
| 87/05018 | 8/1987 | World Int. Prop. O. |

OTHER PUBLICATIONS

Gray et al., Liquid Crystals & Plastic Crystals, vol. 1, pp. 142-143 (1975).
Mol. Cryst. Liq. Cryst., 1978, vol. 48, pp. 37-51.

*Primary Examiner*—John S. Maples
*Assistant Examiner*—Richard Treanor
*Attorney, Agent, or Firm*—Stevens, Davis, Miller & Mosher

[57] ABSTRACT

Disclosed are herein optically active ether derivatives represented by the formula (I):

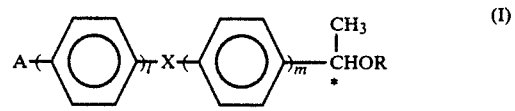

(wherein X represents —COO— or —OCO—; A represents an alkyl or alkoxyl group having 3 to 15 carbon atoms; R represents an alkyl or alkyloxyalkyl group having 1 to 20 carbon atoms; l and m each represents a number of 1 to 2; and * indicates an asymmetric carbon atom), preparation processes therefor, liquid crystal materials containing such ether derivatives as active ingredient, and an optical switching element using said liquid crystal materials as liquid crystal element.

9 Claims, No Drawings

5,013,479

OPTICALLY ACTIVE ETHER DERIVATIVES, PREPARATION PROCESS THEREFOR, LIQUID CRYSTAL MATERIALS AND AN OPTICAL SWITCHING ELEMENT

This application is a continuation of application Ser. No. 07/201,877, filed June 3, 1988, abandoned.

BACKGROUND OF THE INVENTION

1. FIELD OF THE INVENTION

This invention relates to the optically active ether derivatives represented by the formula (I):

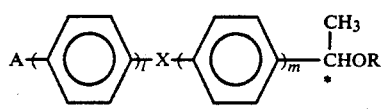

(wherein X represents —COO— or —OCO—; A represents an alkyl or alkoxyl group having 3 to 15 carbon atoms; R represents an alkyl or alkyloxyalkyl group having 1 to 20 carbon atoms; l and m each represents a number of 1 or 2; and * indicates an asymmetric carbon atom), preparation processes therefor, liquid crystal materials containing such ether derivatives as active ingredient, and an optical switching element using said liquid crystal materials as liquid crystal element.

2. DESCRIPTION OF THE PRIOR ART

The optically active ether derivatives represented by the formula (I) are the novel compounds found out for the first time by the present inventors. These compounds are useful as liquid crystal compounds, especially ones showing excellent responsiveness in video display. Further, the compounds of this invention can be worked into liquid crystal compositions that can be utilized as a liquid crystal element for producing an optical switching element.

When the term "liquid crystal compounds" is used in this specification, it means not only those compounds which are per se capable of forming a liquid crystal phase but also the compounds which are useful as a component to blended for a liquid crystal even if they per se cannot be observed as a liquid crystal phase.

Image display devices utilizing liquid crystal are now widely provided for practical application, and particularly, TN (twisted nematic) type display system is popularly employed for such devices.

This system has many advantages such as small power consumption and softness to the eye because of the light-receiving type display panel which itself is not luminous, but on the other hand it has the defect that the response speed in image display is low.

High-speed response is however, especially required in the recent image displays, and many efforts have been made for improving the response characteristics of the liquid crystal compounds. However, the above-mentioned twisted nematic type display system still can not stand comparison with the luminescent type display systems such as light-emitting diode, electroluminescence or plasma displays in response time.

Efforts have been continued for finding out a new display system which is capable of high-speed response while making full use of the advantages of liquid crystal displays which are light-receiving type and low in power consumption, and one result thereof has been the proposal of a display device utilizing the optical switching phenomenon of ferroelectric liquid crystal such as disclosed in Applied Physical Letter, 36, 899 (1980). This ferroelectric liquid crystal was discovered by R. B. Mayer et al (Journal de Physique, 36, L-69 (1975)) and is considered to fall in the same category as chiral smectic C phase (hereinafter abbreviated as Sc* phase) in terms of molecular arrangement. The display devices utilizing such ferroelectric liquid crystal are divided into types: birefringence mode using two pieces of polarizer and a liquid crystal element and gest-host mode using one piece of polarizer and a liquid crystal element mixed with a dichroic dye.

Regarding the liquid crystal compounds used in these display systems, in the case of birefringence mode, a material having a tilt angle of 22.5° is preferably used as such material can give the optimal contrast, while in the case of gest-host mode, a material having a tilt angle as close to 45° as possible is preferably used.

However, there has yet been found no liquid crystal material which shows spontaneous polarization necessary for high-speed response, is chemically stable and also has a high tilt angle and liquid crystal properties in the low temperature region. Use of a liquid crystal material with high tilt angle is also important for allowing free adjustment of tilt angle of the composition comprising such liquid crystal material.

In view of the above, the present inventors have made extensive studies for developing a more useful ferro-electric liquid crystal showing sufficient spontaneous polarization, chemically stable (halogen-free in the molecule) and capable of high-speed response and, as a result, have succeeded in achieving the present invention.

SUMMARY OF THE INVENTION

The present invention provides the optically active ether derivatives represented by the formula (I):

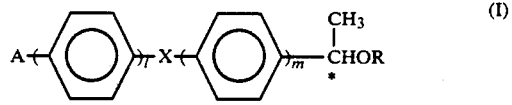

(wherein X represents —COO— or —OCO—; A represents an alkyl or alkoxyl group having 3 to 15 carbon atoms; R represents an alkyl or alkyloxyalkyl group having 1 to 20 carbon atoms; l and m each represents a number of 1 or 2; and * indicates an asymmetric carbon atom), preparation processes therefor, liquid crystal materials containing said ether derivatives as active ingredient and an optical switching element using said materials as liquid crystal element.

DETAILED DESCRIPTION OF THE INVENTION

Many of the optically active ether derivatives represented by the formula (I) according to this invention are the liquid crystal compounds presenting a liquid crystal phase which falls in the category of $S_A$ phase or Sc* phase.

In the Sc* phase specific to ferroelectric liquid crystals, the molecules are arranged with an inclination to a specific direction, such direction of inclination being slightly shifted from layer to layer, and a helical structure is observed in molecular orientation (Mol. Cryst. Liq. Cryst., 40, 30 (1977)). The Sc* phase is also characterized in that spontaneous polarization takes place in a direction vertical to the axis of said helix.

As the structural conditions for the formation of conventional ferroelectric liquid crystals, it is pointed out that the liquid crystal has an optical active group for inducing a helical molecular arrangement at the end of the molecular chain, and that the crystal also has at the end portion of the molecular chain a substituent having a permanent dipole moment in a direction substantially vertical to the major axis of molecule for inducing spontaneous polarization.

It is essential that an optical active group is present in the molecule, but it is said that in order to induce a greater degree of spontaneous polarization, it is desirable to have the optical active group positioned close to the core (Liquid Crystals and Ordered Fluids, 4, 1-32 (1982)). It has been considered, however, that a compound having the optical active center close to the core of its molecular structure is hardly capable of presenting its liquid crystal phase.

The optically active ether derivatives represented by the formula (I) according to this invention meet said conditions and have a quite novel structure and unique properties unseen in the conventional ferroelectric liquid crystal compounds because of the position of optical active center directly bonded to the core of the molecule.

Thus, the present inventors found that the optically active ether derivatives represented by the formula (I) are capable of effecting sufficient spontaneous polarization and can realize high-speed response in application to display devices as such ether derivatives have the optical active center directly at the core of the molecule.

The optically active ether derivatives represented by the formula (I) according to this invention can be produced by reacting optically active phenol compounds represented by the formula (II):

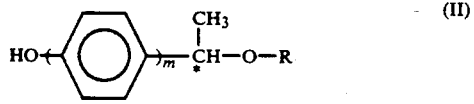

(wherein R, m and * have the same meanings as defined above) with carboxylic acid compounds represented by the formula (IV):

(wherein A and l are as defined above, and R' represents a hydroxyl group or a halogen atom), or by reacting optically active carboxylic acids represented by the formula (III):

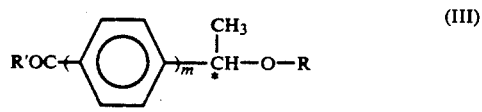

(wherein R, R', m and * have the meanings given above) with phenols represented by the formula (V):

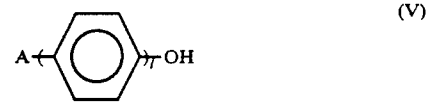

(wherein A and l are as defined above).

The optically active phenol compounds (II) containing asymmetric carbon, which are used as starting material in the above reactions, can be produced, for instance, by reacting 4-hydroxyacetophenone or 4-acetyl-4'-hydroxybiphenyl with sodium hydride and benzyl halide to convert the hydroxyl group into benzyl ether, then reducing the acetyl group into α-hydroxyethyl by using sodium borohydride or the like, reacting the resulting product with acetyl chloride-pyridine to form an acetate, subjecting this acetate to asymmetric hydrolysis by using an esterase, e.g. lipase to form optically active α-hydroxyethyl group, alkylating the resulting compound by using a halide or tosylate and sodium hydride, and finally debenzylating the alkylated compound using hydrogen and a palladium catalyst.

The optically active carboxylic acids (III) containing asymmetric carbon can be produced, for instance, by reducing methyl acetylbenzoate or 4-acetyl-4'-methoxycarbonylbiphenyl with sodium borohydride to convert the acetyl group into α-hydroxyethyl group, reacting the resulting compound with acetyl chloridepyridine to form an acetate, subjecting it to asymmetric hydrolysis by using an esterase, e.g. lipase to form optically active α-hydroxyethyl group, alkylating the resulting compound by using a halide or tosylate and sodium hydride, and hydrolyzing the produced ether with an alkali.

Typical examples of said optically active phenol compounds (II) and optically active carboxylic acids (III) are 4-(1-alkoxyethyl)phenol, 4'-(1-alkoxyethyl)-4-hydroxy-biphenyl, 4-(1-alkyloxyalkoxyethyl)phenol, 4'-(1-alkyloxyalkoxyethyl)-4-hydroxybiphenyl, 4-(1-alkoxyethyl)benzoic acid, 4-(alkyloxyalkoxyethyl)benzoic acid, 4'-(1-alkoxyethyl)-4-biphenylcarboxylic acid, and 4'-(1-alkyloxyalkoxyethyl)-4-biphenylcarboxylic acid. These compounds can be used in the form of acid halides (acid chloride, acid bromide, etc.) or, in the case of phenols, in the form of phenol or metal phenolates.

In the above exemplification of optically active phenols and carboxylic acids, the "alkoxy" or "alkyloxyalkoxy" corresponds to —OR in the formulae (II) and (III), and the substituent R in this group can be, for example, a straight-chain alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl and the like, a branched alkyl such as 2-methylbutyl, 3-methylpentyl, 4-methylhexyl, 5-methylheptyl, 6-methyloctyl, 1-methylpropyl, 1-methylbutyl, 1-methylpentyl, 1-methylhexyl, 2-ethylbutyl, 1-methylheptyl and the like, or an alkyloxyalkyl such as methoxymethyl, methoxyethyl, methoxypropyl, methoxybutyl, methoxypentyl, methoxyhexyl, methoxyheptyl, methoxyoctyl, methoxynonyl, methoxydecyl, ethoxymethyl, ethoxyethyl, ethoxypropyl, ethoxybutyl, ethoxypentyl, ethoxyhexyl, ethoxyheptyl, ethoxyoctyl, ethoxynonyl, ethoxydecyl, propoxymethyl, propoxyethyl, propoxypropyl, propoxybutyl, propoxypentyl, propoxyhexyl, propoxyoctyl, propoxydecyl, butoxymethyl, butoxyethyl, butoxypropyl, butoxybutyl, butoxypentyl, butoxyhexyl, butoxyheptyl, butoxynonyl, pentyloxymethyl, pentyloxyethyl, pentyloxypropyl, pentyloxybutyl, pentyloxypentyl, pentyloxyoctyl, pentyloxydecyl, hexyloxymethyl, hexyloxyethyl, hexyloxypropyl, hexyloxybutyl, hexyloxypentyl, hexyloxyhexyl, hexyloxyoctyl, hexyloxynonyl, hexyloxydecyl, heptyloxymethyl, heptyloxyethyl, heptyloxypropyl, heptyloxypentyl, octyloxymethyl, octyloxyethyl, decyloxymethyl, decyloxyethyl, decyloxypropyl and the like. In said branched alkyls, the branching carbon may be optically active one.

The carboxylic acid compounds (IV) and phenols (V) used as another starting material in said reactions are mostly the known compounds and can be produced according to the methods disclosed in the literature.

Examples of such carboxylic acid compounds (IV) and phenols (V) are 4-alkoxybenzoic acid, 4-alkylbenzoic acid, 4'-alkoxy-4-biphenylcarboxylic acid, 4'-alkyl-4-biphenylcarboxylic acid, 4-alkoxyphenol, 4-alkylphenol, 4'-alkoxy-4-biphenylcarboxylic acid, and 4'-alkyl-4-biphenylcarboxylic acid. These compounds can be used in the form of acid halides (acid chloride, acid bromide, etc.) or, in the case of phenols, in the form of phenol or metal phenolates.

In the above compounds, the alkyl group or the alkyl moiety of alkoxy group can be, for instance, propyl, butyl, pentyl, hexyl, heptyl, octyl, nonyl, decyl, undecyl, dodecyl, tridecyl, tetradecyl, pentadecyl or the like.

An ordinary esterification method can be applied for the reaction of optically active phenol compound (II) and carboxylic acid compound (IV) or the reaction of optically active carboxylic acid (III) and phenol (V), and such reaction can be carried out in the presence or absence of a solvent by using a catalyst.

In case of using a solvent in these reactions, such solvent is selected from those which are inert to the reaction, such as aliphatic or aromatic hydrocarbons, ethers, halogenated hydrocarbons and the like, the typical examples thereof being tetrahydrofuran, ethyl ether, acetone, methyl ethyl ketone, toluene, benzene, chlorobenzene, dichloromethane, dichloroethane, chloroform, carbon tetrachloride, dimethylformamide, hexane and the like. These solvents may be used either singly or in combination. No specific limitations are imposed on the amount of such solvent (s) used.

Since the optically active phenol compound (II) and the optically active carboxylic acid compound (III) used in the reaction are expensive, it is advisable to use the other starting material, viz. carboxylic acid compound (IV) or phenol (V), in an excess amount, usually 1 to 4 equivalents, preferably 1 to 2 equivalents to the optically active compound (II) or (III).

As the catalyst, there can be used organic or inorganic basic materials such as dimethylaminopyridine, triethylamine, tri-n-butylamine, pyridine, picoline, collidine, imidazole, sodium carbonate, sodium methylate, potassium hydrogencarbonate and the like.

Organic or inorganic acids such as toluenesulfonic acid, methanesulfonic acid, sulfuric acid, etc., are also usable as catalyst.

It is also possible to use a condensing reagent in the case of dehydration for the carboxylic acids and phenols.

As the condensing reagent, there can be used organic materials such as N,N'-dicyclohexyl carbodiimide, N-cyclohexyl-N'-(4-diethylamino)cyclohexyl carbodiimide, imidazoylimidazole and the like.

If necessary there can be used organic amines such as 4-pyrollidinopyridine, pyridine, triethylamine and the like.

The amount of a condensing reagent is usually 1 to 1.2 equivalents to the carboxylic acid.

The amount of organic amine is usually 0.01 to 0.2 equivalent to a condensing reagent.

The amount of the catalyst to be used is not specified as it varies depending on the type of the starting materials used, their combination with the catalyst used and other factors, but in case of using an acid halide as a starting material, a basic material is used as catalyst in an amount not less than one equivalent to said acid halide.

The reaction temperature is usually $-30°$ C. to $100°$ C.

The reaction time is not subject to any specific limitations.

After the reaction has been completed, the reaction product is subjected to the ordinary separating means such as extraction, separation of liquid phase, concentration, etc., to isolate the objective optically active ether derivative of the formula (I). If necessary, the product may be purified by column chromatography, recrystallization or other means.

The optically active ether derivatives to be thus obtained are actually exemplified as follows:

(4-propyl)phenyl 4-[4-(1-methoxyethyl)phenyl]-benzoate,
(4-propyl)phenyl 4-[4-(1-ethoxyethyl)phenyl]-benzoate,
(4-propyl)phenyl 4-[4-(1-propoxyethyl)phenyl]-benzoate,
(4-propyl)phenyl 4-[4-(1-butoxyethyl)phenyl]-benzoate,
(4-propyl)phenyl 4-[4-(1-pentyloxyethyl)phenyl]-benzoate,
(4-propyl)phenyl 4-[4-(1-hexyloxyethyl)phenyl]-benzoate,
(4-propyl)phenyl 4-[4-(1-heptyloxyethyl)phenyl]-benzoate,
(4-propyl)phenyl 4-[4-(1-octyloxyethyl)phenyl]-benzoate,
(4-propyl)phenyl 4-[4-(1-nonyloxyethyl)phenyl]-benzoate,
(4-propyl)phenyl 4-[4-(1-decyloxyethyl)phenyl]-benzoate,
(4-propyl)phenyl 4-[4-(1-dodecyloxyethyl)-phenyl]-benzoate,
(4-propyl)phenyl 4-[4-(1-tetradecyloxyethyl)-phenyl]benzoate,
(4-propyl)phenyl 4-[4-(1-hexadecyloxyethyl)-phenyl]benzoate,
(4-propyl)phenyl 4-[4-(1-octadecyloxyethyl)-phenyl]-benzoate,
(4-propyl)phenyl 4-[4-(1-eicosyloxyethyl)-phenyl]-benzoate,
(4-butyl)phenyl 4-[4-(1-methoxyethyl)phenyl]-benzoate,
(4-butyl)phenyl 4-[4-(1-ethoxyethyl)phenyl]-benzoate,
(4-butyl)phenyl 4-[4-(1-propoxyethyl)phenyl]-benzoate,
(4-butyl)phenyl 4-[4-(1-butoxyethyl)phenyl]-benzoate,
(4-butyl)phenyl 4-[4-(1-pentyloxyethyl)phenyl]-benzoate,
(4-butyl)phenyl 4-[4-(1-hexyloxyethyl)phenyl]-benzoate, (4-butyl)phenyl 4-[4-(1-heptyloxyethyl)phenyl]-benzoate,
(4-butyl)phenyl 4-[4-(1-octyloxyethyl)phenyl]-benzoate,
(4-butyl)phenyl 4-[4-(1-nonyloxyethyl)phenyl]-benzoate,
(4-butyl)phenyl 4-[4-(1-decyloxyethyl)phenyl]-benzoate,
(4-butyl)phenyl 4-[4-(1-dodecyloxyethyl)phenyl]-benzoate,
(4-butyl)phenyl 4-[4-(1-tetradecyloxyethyl)phenyl]-benzoate,
(4-butyl)phenyl 4-[4-(1-hexadecyloxyethyl)-phenyl]-benzoate,
(4-butyl)phenyl 4-[4-(1-octadecyloxyethyl)-phenyl]-benzoate,
(4-butyl)phenyl 4-[4-(1-eicosyloxyethyl)phenyl]-benzoate,
(4-hexyl)phenyl 4-[4-(1-methoxyethyl)phenyl]-benzoate,
(4-hexyl)phenyl 4-[4-(1-ethoxyethyl)phenyl]-benzoate,
(4-hexyl)phenyl 4-[4-(1-propoxyethyl)phenyl]-benzoate,
(4-hexyl)phenyl 4-[4-(1-butoxyethyl)phenyl]-benzoate,
(4-hexyl)phenyl 4-[4-(1-pentyloxyethyl)phenyl]-benzoate,
(4-hexyl)phenyl 4-[4-(1-heptyloxyethyl)phenyl]-benzoate,
(4-hexyl)phenyl 4-[4-(1-octyloxyethyl)phenyl]-benzoate,
(4-hexyl)phenyl 4-[4-(1-decyloxyethyl)phenyl]-benzoate,
(4-hexyl)phenyl 4-[4-(1-dodecyloxyethyl)phenyl]-benzoate,
(4-hexyl)phenyl 4-[4-(1-pentadecyloxyethyl)-phenyl]-benzoate,
(4-hexyl)phenyl 4-[4-(1-hexadecyloxyethyl)-phenyl]-benzoate,
(4-hexyl)phenyl 4-[4-(1-octadecyloxyethyl)-phenyl]-benzoate,
(4-hexyl)phenyl 4-[4-(1-eicosyloxyethyl)-phenyl]benzoate,
(4-octyl)phenyl 4-[4-(1-methoxyethyl)phenyl]-benzoate,
(4-octyl)phenyl 4-[4-(1-ethoxyethyl)phenyl]-benzoate,
(4-octyl)phenyl 4-[4-(1-butoxyethyl)phenyl]-benzoate,
(4-octyl)phenyl 4-[4-(1-pentyloxyethyl)phenyl]-benzoate,
(4-octyl)phenyl 4-[4-(1-heptyloxyethyl)phenyl]-benzoate,
(4-octyl)phenyl 4-[4-(1-nonyloxyethyl)phenyl]-benzoate,
(4-octyl)phenyl 4-[4-(1-decyloxyethyl)phenyl]-benzoate,
(4-octyl)phenyl 4-[4-(1-dodecyloxyethyl)phenyl]-benzoate,
(4-octyl)phenyl 4-[4-(1-tetradecyloxyethyl)-phenyl]-benzoate,
(4-octyl)phenyl 4-[4-(1-hexadecyloxyethyl)-phenyl]-benzoate,
(4-octyl)phenyl 4-[4-(1-octadecyloxyethyl)-phenyl]-benzoate,
(4-octyl)phenyl 4-[4-(1-eicosyloxyethyl)-phenyl]benzoate,
(4-dodecyl)phenyl 4-[4-1-methoxyethyl)phenyl]-benzoate,
(4-dodecyl)phenyl 4-[4-1-propoxyethyl)phenyl]-benzoate,
(4-dodecyl)phenyl 4-[4-1-hexyloxyethyl)phenyl]-benzoate,
(4-dodecyl)phenyl 4-[4-1-nonyloxyethyl)phenyl]-benzoate,
(4-dodecyl)phenyl 4-[4-1-dodecyloxyethyl)phenyl]-benzoate,
(4-dodecyl)phenyl 4-[4-1-hexadecyloxyethyl)-phenyl]benzoate,
(4-dodecyl)phenyl 4-[4-1-octadecyloxyethyl)-phenyl]benzoate,
(4-dodecyl)phenyl 4-[4-1-eicosyloxyethyl)-phenyl]-benzoate,
(4-pentadecyl)phenyl 4-[4-(1-methoxyethyl)-phenyl]-benzoate,
(4-pentadecyl)phenyl 4-[4-(1-propoxyethyl)-phenyl]-benzoate,
(4-pentadecyl)phenyl 4-[4-(1-octyloxyethyl)-phenyl]-benzoate,
(4-pentadecyl)phenyl 4-[4-(1-decyloxyethyl)-phenyl]-benzoate,
(4-pentadecyl)phenyl 4-[4-(1-hexadecyloxyethyl)-phenyl]benzoate,
(4-pentadecyl)phenyl 4-[4-(1-octadecyloxyethyl)-phenyl]benzoate,
(4-pentadecyl)phenyl 4-[4-(1-eicosyloxyethyl)-phenyl]benzoate,
(4-propoxy)phenyl 4-[4-(1-methoxyethyl)phenyl]-benzoate,
(4-propoxy)phenyl 4-[4-(1-ethoxyethyl)phenyl]-benzoate,
(4-propoxy)phenyl 4-[4-(1-propoxyethyl)phenyl]-benzoate,
(4-propoxy)phenyl 4-[4-(1-butoxyethyl)phenyl]-benzoate,
(4-propoxy)phenyl 4-[4-(1-octyloxyethyl)phenyl]-benzoate,
(4-propoxy)phenyl 4-[4-(1-nonyloxyethyl)phenyl]-benzoate,
(4-propoxy)phenyl 4-[4-(1-dodecyloxyethyl)-phenyl]benzoate,
(4-propoxy)phenyl 4-[4-(1-hexadecyloxyethyl)-phenyl]benzoate,
(4-propoxy)phenyl 4-[4-(1-octadecyloxyethyl)-phenyl]benzoate,
(4-propoxy)phenyl 4-[4-(1-eicosyloxyethyl)-phenyl]-benzoate,
(4-butoxy)phenyl 4-[4-(1-methoxyethyl)phenyl]-benzoate,
(4-butoxy)phenyl 4-[4-(1-ethoxyethyl)phenyl]-benzoate,
(4-butoxy)phenyl 4-[4-(1-butoxyethyl)phenyl]-benzoate,
(4-butoxy)phenyl 4-[4-(1-hexyloxyethyl)phenyl]-benzoate,
(4-butoxy)phenyl 4-[4-(1-nonyloxyethyl)phenyl]-benzoate,
(4-butoxy)phenyl 4-[4-(1-decyloxyethyl)phenyl]-benzoate,
(4-butoxy)phenyl 4-[4-(1-hexadecyloxyethyl)-phenyl]benzoate,
(4-butoxy)phenyl 4-[4-(1-octadecyloxyethyl)-phenyl]benzoate,
(4-butoxy)phenyl 4-[4-(1-eicosyloxyethyl)-phenyl]-benzoate, (4-pentyloxy)phenyl 4-[4-(1-methoxyethyl)-phenyl]benzoate,
(4-pentyloxy)phenyl 4-[4-(1-ethoxyethyl)phenyl]benzoate,
(4-pentyloxy)phenyl 4-[4-(1-propoxyethyl)-phenyl]benzoate,
(4-pentyloxy)phenyl 4-[4-(1-butoxyethyl)phenyl]benzoate,
(4-pentyloxy)phenyl 4-[4-(1-hexyloxyethyl)-phenyl]benzoate,
(4-pentyloxy)phenyl 4-[4-(1-nonyloxyethyl)-phenyl]benzoate,
(4-pentyloxy)phenyl 4-[4-(1-dodecyloxyethyl)-phenyl]benzoate,
(4-pentyloxy)phenyl 4-[4-(1-hexadecyloxyethyl)-phenyl]benzoate,
(4-pentyloxy)phenyl 4-[4-(1-octadecyloxyethyl)-phenyl]benzoate,
(4-pentyloxy)phenyl 4-[4-(1-eicosyloxyethyl)-phenyl]benzoate,
(4-octyloxy)phenyl 4-[4-(1-methoxyethyl)phenyl]benzoate,
(4-octyloxy)phenyl 4-[4-(1-ethoxyethyl)phenyl]-benzoate,
(4-octyloxy)phenyl 4-[4-(1-butoxyethyl)phenyl]-benzoate,
(4-octyloxy)phenyl 4-[4-(1-hexyloxyethyl)-phenyl]benzoate,
(4-octyloxy)phenyl 4-[4-(1-nonyloxyethyl)-phenyl]benzoate,
(4-octyloxy)phenyl 4-[4-(1-dodecyloxyethyl)-phenyl]benzoate,
(4-octyloxy)phenyl 4-[4-(1-hexadecyloxyethyl)-phenyl]benzoate.
(4-octyloxy)phenyl 4-[4-(1-octadecyloxyethyl)-phenyl]benzoate,
(4-octyloxy)phenyl 4-[4-(1-eicosyloxyethyl)-phenyl]benzoate,
(4-dodecyloxy)phenyl 4-[4-(1-methoxyethyl)-phenyl]benzoate,
(4-dodecyloxy)phenyl 4-[4-(1-ethoxyethyl)-phenyl]benzoate,
(4-dodecyloxy)phenyl 4-[4-(1-propoxyethyl)-phenyl]benzoate,
(4-dodecyloxy)phenyl 4-[4-(1-butoxyethyl)-phenyl]benzoate,
(4-dodecyloxy)phenyl 4-[4-(1-hexyloxyethyl)-phenyl]benzoate,
(4-dodecyloxy)phenyl 4-[4-(1-octyloxyethyl)-phenyl]benzoate,
(4-dodecyloxy)phenyl 4-[4-(1-nonyloxyethyl)-phenyl]benzoate,
(4-dodecyloxy)phenyl 4-[4-(1-dodecyloxyethyl)-phenyl]benzoate,
(4-dodecyloxy)phenyl 4-[4-(1-tetradecyloxyethyl)-phenyl]benzoate,
(4-dodecyloxy)phenyl 4-[4-(1-hexadecyloxyethyl)-phenyl]benzoate,
(4-dodecyloxy)phenyl 4-[4-(1-octadecyloxyethyl)-phenyl]benzoate,
(4-dodecyloxy)phenyl 4-[4-(1-eicosyloxyethyl)-phenyl]benzoate,
(4-pentadecyloxy)phenyl 4-[4-(1-methoxyethyl)-phenyl]benzoate,
(4-pentadecyloxy)phenyl 4-[4-(1-ethoxyethyl)-phenyl]benzoate,
(4-pentadecyloxy)phenyl 4-[4-(1-propoxyethyl)-phenyl]benzoate,
(4-pentadecyloxy)phenyl 4-[4-(1-butoxyethyl)-phenyl]benzoate,
(4-pentadecyloxy)phenyl 4-[4-(1-hexyloxyethyl)-phenyl]benzoate,
(4-pentadecyloxy)phenyl 4-[4-(1-octyloxyethyl)-phenyl]benzoate,
(4-pentadecyloxy)phenyl 4-[4-(1-dodecyloxyethyl)-phenyl]benzoate,
(4-pentadecyloxy)phenyl 4-[4-(1-tetradecyloxyethyl)-phenyl]benzoate,
(4-pentadecyloxy)phenyl 4-[4-(1-hexadecyloxyethyl)-phenyl]benzoate,
(4-pentadecyloxy)phenyl 4-[4-(1-octadecyloxyethyl)-phenyl]benzoate,
(4-pentadecyloxy)phenyl 4-[4-(1-eicosyloxyethyl)-phenyl]benzoate,
(4-propyl)phenyl 4-(1-methoxyethyl)benzoate,
(4-propyl)phenyl 4-(1-ethoxyethyl)benzoate,
(4-propyl)phenyl 4-(1-propoxyethyl)benzoate,
(4-propyl)phenyl 4-(1-butoxyethyl)benzoate,
(4-propyl)phenyl 4-(1-hexyloxyethyl)benzoate,
(4-propyl)phenyl 4-(1-octyloxyethyl)benzoate,
(4-propyl)phenyl 4-(1-nonyloxyethyl)benzoate,
(4-propyl)phenyl 4-(1-decyloxyethyl)benzoate,
(4-propyl)phenyl 4-(1-dodecyloxyethyl)benzoate,
(4-propyl)phenyl 4-(1-tetradecyloxyethyl)-benzoate,
(4-propyl)phenyl 4-(1-hexadecyloxyethyl)benzoate,
(4-propyl)phenyl 4-(1-octadecyloxyethyl)benzoate,
(4-propyl)phenyl 4-(1-eicosyloxyethyl)benzoate,
(4-butyl)phenyl 4-(1-methoxyethyl)benzoate,
(4-butyl)phenyl 4-(1-ethoxyethyl)benzoate,
(4-butyl)phenyl 4-(1-propoxyethyl)benzoate,
(4-butyl)phenyl 4-(1-butoxyethyl)benzoate,
(4-butyl)phenyl 4-(1-hexyloxyethyl)benzoate,
(4-butyl)phenyl 4-(1-octyloxyethyl)benzoate,
(4-butyl)phenyl 4-(1-nonyloxyethyl)benzoate,
(4-butyl)phenyl 4-(1-decyloxyethyl)benzoate,
(4-butyl)phenyl 4-(1-dodecyloxyethyl)benzoate,
(4-butyl)phenyl 4-(1-tetradecyloxyethyl)benzoate,
(4-butyl)phenyl 4-(1-hexadecyloxyethyl)benzoate,
(4-butyl)phenyl 4-(1-octadecyloxyethyl)benzoate,
(4-butyl)phenyl 4-(1-eicosyloxyethyl)benzoate,
(4-hexyl)phenyl 4-(1-methoxyethyl)benzoate,
(4-hexyl)phenyl 4-(1-ethoxyethyl)benzoate,
(4-hexyl)phenyl 4-(1-propoxyethyl)benzoate,
(4-hexyl)phenyl 4-(1-butoxyethyl)benzoate,
(4-hexyl)phenyl 4-(1-pentyloxyethyl)benzoate,
(4-hexyl)phenyl 4-(1-hexyloxyethyl)benzoate,
(4-hexyl)phenyl 4-(1-heptyloxyethyl)benzoate,
(4-hexyl)phenyl 4-(1-octyloxyethyl)benzoate,
(4-hexyl)phenyl 4-(1-decyloxyethyl)benzoate,
(4-hexyl)phenyl 4-(1-dodecyloxyethyl)benzoate,
(4-hexyl)phenyl 4-(1-pentadecyloxyethyl)benzoate,
(4-hexyl)phenyl 4-(1-hexadecyloxyethyl)benzoate,
(4-hexyl)phenyl 4-(1-octadecyloxyethyl)benzoate,
(4-hexyl)phenyl 4-(1-eicosyloxyethyl)benzoate,
(4-octyl)phenyl 4-(1-methoxyethyl)benzoate,
(4-octyl)phenyl 4-(1-ethoxyethyl)benzoate,
(4-octyl)phenyl 4-(1-butoxyethyl)benzoate,
(4-octyl)phenyl 4-(1-pentyloxyethyl)benzoate,
(4-octyl)phenyl 4-(1-heptyloxyethyl)benzoate,
(4-octyl)phenyl 4-(1-nonyloxyethyl)benzoate,
(4-octyl)phenyl 4-(1-dodecyloxyethyl)benzoate,
(4-octyl)phenyl 4-(1-tetradecyloxyethyl)benzoate,
(4-octyl)phenyl 4-(1-hexadecyloxyethyl)benzoate,
(4-octyl)phenyl 4-(1-octadecyloxyethyl)benzoate,
(4-octyl)phenyl 4-(1-eicosyloxyethyl)benzoate,
(4-dodecyl)phenyl 4-(1-methoxyethyl)benzoate, (4-dodecyl)phenyl 4-(1-propoxyethyl)benzoate,
(4-dodecyl)phenyl 4-(1-hexyloxyethyl)benzoate,
(4-dodecyl)phenyl 4-(1-nonyloxyethyl)benzoate,
(4-dodecyl)phenyl 4-(1-dodecyloxyethyl)benzoate,
(4-dodecyl)phenyl 4-(1-hexadecyloxyethyl)-benzoate,
(4-dodecyl)phenyl 4-(1-octadecyloxyethyl)-benzoate,
(4-dodecyl)phenyl 4-(1-eicosyloxyethyl)benzoate,
(4-pentadecyl)phenyl 4-(1-methoxyethyl)benzoate,
(4-pentadecyl)phenyl 4-(1-propoxyethyl)benzoate,
(4-pentadecyl)phenyl 4-(1-octyloxyethyl)benzoate,
(4-pentadecyl)phenyl 4-(1-decyloxyethyl)benzoate,
(4-pentadecyl)phenyl 4-(1-hexadecyloxyethyl)-benzoate,
(4-pentadecyl)phenyl 4-(1-octadecyloxyethyl)-benzoate,
(4-pentadecyl)phenyl 4-(1-eicosyloxyethyl)-benzoate,
(4-propoxy)phenyl 4-(1-methoxyethyl)benzoate,
(4-propoxy)phenyl 4-(1-ethoxyethyl)benzoate,
(4-propoxy)phenyl 4-(1-propoxyethyl)benzoate,
(4-propoxy)phenyl 4-(1-butoxyethyl)benzoate,
(4-propoxy)phenyl 4-(1-hexyloxyethyl)benzoate,
(4-propoxy)phenyl 4-(1-octyloxyethyl)benzoate,
(4-propoxy)phenyl 4-(1-nonyloxyethyl)benzoate,
(4-propoxy)phenyl 4-(1-dodecyloxyethyl)benzoate,
(4-propoxy)phenyl 4-(1-tetradecyloxyethyl)-benzoate,
(4-propoxy)phenyl 4-(1-hexadecyloxyethyl)-benzoate,
(4-propoxy)phenyl 4-(1-octadecyloxyethyl)-benzoate,
(4-propoxy)phenyl 4-(1-eicosyloxyethyl)benzoate,
(4-butoxy)phenyl 4-(1-methoxyethyl)benzoate,
(4-butoxy)phenyl 4-(1-ethoxyethyl)benzoate,
(4-butoxy)phenyl 4-(1-butoxyethyl)benzoate,
(4-butoxy)phenyl 4-(1-hexyloxyethyl)benzoate,
(4-butoxy)phenyl 4-(1-octyloxyethyl)benzoate,
(4-butoxy)phenyl 4-(1-decyloxyethyl)benzoate,
(4-butoxy)phenyl 4-(1-tridecyloxyethyl)benzoate,
(4-butoxy)phenyl 4-(1-hexadecyloxyethyl)benzoate,
(4-butoxy)phenyl 4-(1-octadecyloxyethyl)benzoate,
(4-butoxy)phenyl 4-(1-eicosyloxyethyl)benzoate,
(4-pentyloxy)phenyl 4-(1-methoxyethyl)benzoate,
(4-pentyloxy)phenyl 4-(1-ethoxyethyl)benzoate,
(4-pentyloxy)phenyl 4-(1-propoxyethyl)benzoate,
(4-pentyloxy)phenyl 4-(1-butoxyethyl)benzoate,
(4-pentyloxy)phenyl 4-(1-hexyloxyethyl)benzoate,
(4-pentyloxy)phenyl 4-(1-nonyloxyethyl)benzoate,
(4-pentyloxy)phenyl 4-(1-dodecyloxyethyl)-benzoate,
(4-pentyloxy)phenyl 4-(1-hexadecyloxyethyl)-benzoate,
(4-pentyloxy)phenyl 4-(1-octadecyloxyethyl)-benzoate,
(4-pentyloxy)phenyl 4-(1-eicosyloxyethyl)-benzoate,
(4-octyloxy)phenyl 4-(1-methoxyethyl)benzoate,
(4-octyloxy)phenyl 4-(1-ethoxyethyl)benzoate,
(4-octyloxy)phenyl 4-(1-butoxyethyl)benzoate,
(4-octyloxy)phenyl 4-(1-hexyloxyethyl)benzoate,
(4-octyloxy)phenyl 4-(1-nonyloxyethyl)benzoate,
(4-octyloxy)phenyl 4-(1-dodecyloxyethyl)benzoate,
(4-octyloxy)phenyl 4-(1-hexadecyloxyethyl)-benzoate,
(4-octyloxy)phenyl 4-(1-octadecyloxyethyl)-benzoate,
(4-octyloxy)phenyl 4-(1-eicosyloxyethyl)benzoate,
(4-dodecyloxy)phenyl 4-(1-methoxyethyl)benzoate,
(4-dodecyloxy)phenyl 4-(1-ethoxyethyl)benzoate,
(4-dodecyloxy)phenyl 4-(1-propoxyethyl)benzoate,
(4-dodecyloxy)phenyl 4-(1-butoxyethyl)benzoate,
(4-dodecyloxy)phenyl 4-(1-hexyloxyethyl)benzoate,
(4-dodecyloxy)phenyl 4-(1-octyloxyethyl)benzoate,
(4-dodecyloxy)phenyl 4-(1-nonyloxyethyl)benzoate,
(4-dodecyloxy)phenyl 4-(1-dodecyloxyethyl)-benzoate,
(4-dodecyloxy)phenyl 4-(1-tetradecyloxyethyl)-benzoate,
(4-dodecyloxy)phenyl 4-(1-hexadecyloxyethyl)-benzoate,
(4-dodecyloxy)phenyl 4-(1-octadecyloxyethyl)-benzoate,
(4-dodecyloxy)phenyl 4-(1-eicosyloxyethyl)-benzoate,
(4-pentadecyloxy)phenyl 4-(1-methoxyethyl)-benzoate,
(4-pentadecyloxy)phenyl 4-(1-ethoxyethyl)-benzoate,
(4-pentadecyloxy)phenyl 4-(1-propoxyethyl)-benzoate,
(4-pentadecyloxy)phenyl 4-(1-butoxyethyl)-benzoate,
(4-pentadecyloxy)phenyl 4-(1-hexyloxyethyl)-benzoate,
(4-pentadecyloxy)phenyl 4-(1-octyloxyethyl)-benzoate,
(4-pentadecyloxy)phenyl 4-(1-decyloxyethyl)-benzoate,
(4-pentadecyloxy)phenyl 4-(1-dodecyloxyethyl)-benzoate,
(4-pentadecyloxy)phenyl 4-(1-tetradecyloxyethyl)-benzoate,
(4-pentadecyloxy)phenyl 4-(1-hexadecyloxyethyl)-benzoate,
(4-pentadecyloxy)phenyl 4-(1-octadecyloxyethyl)-benzoate,
(4-pentadecyloxy)phenyl 4-(1-eicosyloxyethyl)-benzoate,
4-[(1-methoxyethyl)]phenyl 4-propylbenzoate,
4-[(1-ethoxyethyl)]phenyl 4-propylbenzoate,
4-[(1-propoxyethyl)]phenyl 4-propylbenzoate,
4-[(1-hexyloxyethyl)]phenyl 4-propylbenzoate,
4-[(1-octyloxyethyl)]phenyl 4-propylbenzoate,
4-[(1-decyloxyethyl)]phenyl 4-propylbenzoate,
4-[(1-dodecyloxyethyl)]phenyl 4-propylbenzoate,
4-[(1-tetradecyloxyethyl)]benzyl 4-propylbenzoate,
4-[(1-hexadecyloxyethyl)]phenyl 4-propylbenzoate,
4-[(1-octadecyloxyethyl)]phenyl 4-propylbenzoate,
4-[(1-eicosyloxyethyl)]phenyl 4-propylbenzoate,
4-[(1-methoxyethyl)]phenyl 4-butylbenzoate,
4-[(1-ethoxyethyl)]phenyl 4-butylbenzoate,
4-[(1-butoxyethyl)]phenyl 4-butylbenzoate,
4-[(1-pentyloxyethyl)]phenyl 4-butylbenzoate,
4-[(1-heptyloxyethyl)]phenyl 4-butylbenzoate,
4-[(1-nonyloxyethyl)]phenyl 4-butylbenzoate,
4-[(1-dodecyloxyethyl)]phenyl 4-butylbenzoate,
4-[(1-hexadecyloxyethyl)]phenyl 4-butylbenzoate,
4-[(1-octadecyloxyethyl)]phenyl 4-butylbenzoate,
4-[(1-nonadecyloxyethyl)]phenyl 4-butylbenzoate,
4-[(1-eicosyloxyethyl)]phenyl 4-butylbenzoate,
4-[(1-methoxyethyl)]phenyl 4-hexylbenzoate,
4-[(1-propoxyethyl)]phenyl 4-hexylbenzoate,
4-[(1-hexyloxyethyl)]phenyl 4-hexylbenzoate,
4-[(1-nonyloxyethyl)]phenyl 4-hexylbenzoate,
4-[(1-decyloxyethyl)]phenyl 4-hexylbenzoate,
4-[(1-dodecyloxyethyl)]phenyl 4-hexylbenzoate,
4-[(1-pentadecyloxyethyl)]phenyl 4-hexylbenzoate,
4-[(1-octadecyloxyethyl)]phenyl 4-hexylbenzoate,
4-[(1-eicosyloxyethyl)]phenyl 4-hexylbenzoate, 4-[(1-methoxyethyl)]phenyl 4-octylbenzoate,
4-[(1-ethoxyethyl)]phenyl 4-octylbenzoate,
4-[(1-butoxyethyl)]phenyl 4-octylbenzoate,
4-[(1-hexyloxyethyl)]phenyl 4-octylbenzoate,
4-[(1-nonyloxyethyl)]phenyl 4-octylbenzoate,
4-[(1-dodecyloxyethyl)]phenyl 4-octylbenzoate,
4-[(1-hexadecyloxyethyl)]phenyl 4-octylbenzoate,
4-[(1-octadecyloxyethyl)]phenyl 4-octylbenzoate,
4-[(1-eicosyloxyethyl)]phenyl 4-octylbenzoate,
4-[(1-methoxyethyl)]phenyl 4-dodecylbenzoate,
4-[(1-ethoxyethyl)]phenyl 4-dodecylbenzoate,
4-[(1-propoxyethyl)]phenyl 4-dodecylbenzoate,
4-[(1-butoxyethyl)]phenyl 4-dodecylbenzoate,
4-[(1-hexyloxyethyl)]phenyl 4-dodecylbenzoate,
4-[(1-octyloxyethyl)]phenyl 4-dodecylbenzoate,
4-[(1-dodecyloxyethyl)]phenyl 4-dodecylbenzoate,
4-[(1-pentadecyloxyethyl)]phenyl 4-dodecylbenzoate,
4-[(1-octadecyloxyethyl)]phenyl 4-dodecylenzoate,
4-[(1-eicosyloxyethyl)]phenyl 4-dodecylbenzoate,
4-[(1-methoxyethyl)]phenyl 4-pentadecylbenzoate,
4-[(1-ethoxyethyl)]phenyl 4-pentadecylbenzoate,
4-[(1-propoxyethyl)]phenyl 4-pentadecylbenzoate,
4-[(1-butoxyethyl)]phenyl 4-pentadecylbenzoate,
4][(1-heptyloxyethyl)]phenyl 4-pentadecylbenzoate,
4-[(1-nonyloxyethyl)]phenyl 4-pentadecylbenzoate,
4-[(1-decyloxyethyl)]phenyl 4-pentadecylbenzoate,
4-[(1-dodecyloxyethyl)]phenyl 4-pentadecylbenzoate,
4-[(1-hexadecyloxyethyl)]phenyl 4-pentadecylenzoate,
4-[(1-octadecyloxyethyl)]phenyl 4-pentadecylbenzoate,
4-[(1-eicosyloxyethyl)]phenyl 4-pentadecylbenzoate,
4-[(1-methoxyethyl)]phenyl 4-propyloxybenzoate,
4-[(1-ethoxyethyl)]phenyl 4-propyloxybenzoate,
4-[(1-propoxyethyl)]phenyl 4-propyloxybenzoate,
4-[(1-hexyloxyethyl)]phenyl 4-propyloxybenzoate,
4-[(1-nonyloxyethyl)]phenyl 4-propyloxybenzoate,
4-[(1-decyloxyethyl)]phenyl 4-propyloxybenzoate,
4-[(1-dodecyloxyethyl)]phenyl 4-propyloxybenzoate,
4-[(1-hexadecyloxyethyl)]phenyl 4-propyloxybenzoate,
4-[(1-octadecyloxyethyl)]phenyl 4-propyloxybenzoate,
4-[(1-eicosyloxyethyl)]phenyl 4-propyloxybenzoate,
4-[(1-methoxyethyl)]phenyl 4-butyloxybenzoate,
4-[(1-ethoxyethyl)]phenyl 4-butyloxybenzoate,
4-[(1-butoxyethyl)]phenyl 4-butyloxybenzoate,
4-[(1-hexyloxyethyl)]phenyl 4-butyloxybenzoate,
4-[(1-octyloxyethyl)]phenyl 4-butyloxybenzoate,
4-[(1-dodecyloxyethyl)]phenyl 4-butyloxybenzoate,
4-[(1-hexadecyloxyethyl)]phenyl 4-butyloxybenzoate,
4-[(1-octadecyloxyethyl)]phenyl 4-butyloxybenzoate,
4-[(1-nonadecyloxyethyl)]phenyl 4-butyloxybenzoate,
4-[(1-methoxyethyl)]phenyl 4-hexyloxybenzoate,
4-[(1-propoxyethyl)]phenyl 4-hexyloxybenzoate,
4-[(1-butoxyethyl)]phenyl 4-hexyloxybenzoate,
4-[(1-hexyloxyethyl)]phenyl 4-hexyloxybenzoate,
4-[(1-nonyloxyethyl)]phenyl 4-hexyloxybenzoate,
4-[(1-tridecyloxyethyl)]phenyl 4-hexyloxybenzoate,
4-[(1-hexadecyloxyethyl)]phenyl 4-hexyloxybenzoate,
4-[(1-octadecyloxyethyl)]phenyl 4-hexyloxybenzoate,
4-[(1-eicosyloxyethyl)]phenyl 4-hexyloxybenzoate,
4-[(1-methoxyethyl)]phenyl 4-octyloxybenzoate,
4-[(1-propoxyethyl)]phenyl 4-octyloxybenzoate,
4-[(1-pentyloxyethyl)]phenyl 4-octyloxybenzoate,
4-[(1-octyloxyethyl)]phenyl 4-octyloxybenzoate,
4-[(1-dodecyloxyethyl)]phenyl 4-octyloxybenzoate,
4-[(1-pentadecyloxyethyl)]phenyl 4-octyloxybenzoate,
4-[(1-octadecyloxyethyl)]phenyl 4-octyloxybenzoate,
4-[(1-eicosyloxyethyl)]phenyl 4-octyloxybenzoate,
4-[(1-methoxyethyl)]phenyl 4-dodecyloxybenzoate,
4-[(1-propoxyethyl)]phenyl 4-dodecyloxybenzoate,
4-[(1-pentyloxyethyl)]phenyl 4-dodecyloxybenzoate,
4-[(1-hexyloxyethyl)]phenyl 4-dodecyloxybenzoate,
4-[(1-nonyloxyethyl)]phenyl 4-dodecyloxybenzoate,
4-[(1-dodecyloxyethyl)]phenyl 4-dodecyloxybenzoate,
4-[(1-hexadecyloxyethyl)]phenyl 4-dodecyloxybenzoate,
4-[(1-octadecyloxyethyl)]phenyl 4-dodecyloxybenzoate,
4-[(1-eicosyloxyethyl)]phenyl 4-dodecyloxy-benzoate,
4-[(1-ethoxyethyl)]phenyl 4-tridecyloxybenzoate,
4-[(1-butoxyethyl)]phenyl 4-tridecyloxybenzoate,
4-[(1-pentyloxyethyl)]phenyl 4-tridecyloxybenzoate,
4-[(1-heptyloxyethyl)]phenyl 4-tridecyloxybenzoate,
4-[(1-nonyloxyethyl)]phenyl 4-tridecyloxybenzoate,
4-[(1-dodecyloxyethyl)]phenyl 4-tridecyloxybenzoate,
4-[(1-hexadecyloxyethyl)]phenyl 4-tridecyloxybenzoate,
4-[(1-octadecyloxyethyl)]phenyl 4-tridecyloxybenzoate,
4-[(1-eicosyloxyethyl)]phenyl 4-tridecyloxybenzoate,
4'-propyl-4-biphenylyl 4-(1-methoxyethyl)benzoate,
4'-propyl-4-biphenylyl 4-(1-ethoxyethyl)-benzoate,
4'-propyl-4-biphenylyl 4-(1-butoxyethyl-benzoate,
)4'-propyl-4-biphenylyl 4-(1-hexyloxyethyl)-benzoate,
4'-propyl-4-biphenylyl 4-(1-octyloxyethyl)-benzoate,
4'-propyl-4-biphenylyl 4-(1-dodecyloxyethyl)-benzoate,
4,-propyl-4-biphenylyl 4-(1-hexadecyloxyethyl)-benzoate,
4'-propyl-4-biphenylyl 4-(1-octadecyloxyethyl)-benzoate,
4'-propyl-4-biphenylyl 4-(1-eicosyloxyethyl)-benzoate,
4'-butyl-4-biphenylyl 4-(1-methoxyethyl)benzoate,
4'-butyl-4-biphenylyl 4-(1-propoxyethyl)benzoate,
4'-butyl-4-biphenylyl 4-(1-butoxyethyl)benzoate,
4'-butyl-4-biphenylyl 4-(1-octyloxyethyl)-benzoate,
4'-butyl-4-biphenylyl 4-(1-dodecyloxyethyl)-benzoate,
4'-butyl-4-biphenylyl 4-(1-hexadecyloxyethyl)-benzoate,
4'-butyl-4-biphenylyl 4-(1-octadecyloxyethyl)-benzoate,
4'-butyl-4-biphenylyl 4-(1-nonadecyloxyethyl)-benzoate,
4'-butyl-4-biphenylyl 4-(1-eicosyloxyethyl)-benzoate,
4'-pentyl-4-biphenylyl 4-(1-methoxyethyl)-benzoate,
4'-pentyl-4-biphenylyl 4-(1-ethoxyethyl)benzoate,
4'-pentyl-4-biphenylyl 4-(1-butoxyethyl)benzoate,
4'-pentyl-4-biphenylyl 4-(1-pentyloxyethyl)-benzoate,
4'-pentyl-4-biphenylyl 4-(1-hexyloxyethyl)-benzoate,
4'-pentyl-4-biphenylyl 4-(1-octyloxyethyl)-benzoate, 4'-pentyl-4-biphenylyl 4-(1-dodecyloxyethyl)-benzoate,
4'-pentyl-4-biphenylyl 4-(1-hexadecyloxyethyl)-benzoate,
4'-pentyl-4-biphenylyl 4-(1-octadecyloxyethyl)-benzoate,
4'-pentyl-4-biphenylyl 4-(1-eicosyloxyethyl)-benzoate,
4'-heptyl-4-biphenylyl 4-(1-methoxyethyl)-benzoate,
4'-heptyl-4-biphenylyl 4-(1-ethoxyethyl)-benzoate,
4'-heptyl-4-biphenylyl 4-(1-propoxyethyl)-benzoate,
4'-heptyl-4-biphenylyl 4-(1-heptyloxyethyl)-benzoate,
4'-heptyl-4-biphenylyl 4-(1-nonyloxyethyl)-benzoate,
4'-heptyl-4-biphenylyl 4-(1-dodecyloxyethyl)-benzoate,
4'-heptyl-4-biphenylyl 4-(1-hexadecyloxyethyl)-benzoate,
4'-heptyl-4-biphenylyl 4-(1-octadecyloxyethyl)-benzoate,
4'-heptyl-4-biphenylyl 4-(1-eicosyloxyethyl)-benzoate,
4'-nonyl-4-biphenylyl 4-(1-methoxyethyl)benzoate,
4'-nonyl-4-biphenylyl 4-(1-ethoxyethyl)benzoate,
4'-nonyl-4-biphenylyl 4-(1-butoxyethyl)benzoate,
4'-nonyl-4-biphenylyl 4-(1-hexyloxyethyl)-benzoate,
4'-nonyl-4-biphenylyl 4-(1-nonyloxyethyl)-benzoate,
4'-nonyl-4-biphenylyl 4-(1-decyloxyethyl)-benzoate,
4'-nonyl-4-biphenylyl 4-(1-hexadecyloxyethyl)-benzoate,
4'-nonyl-4-biphenylyl 4-(1-octadecyloxyethyl)-benzoate,
4'-nonyl-4-biphenylyl 4-(1-eicosyloxyethyl)-benzoate,
4'-dodecyl-4-biphenylyl 4-(1-methoxyethyl)-benzoate,
4'-dodecyl-4-biphenylyl 4-(1-butoxyethyl)-benzoate,
4'-dodecyl-4-biphenylyl 4-(1-octyloxyethyl)-benzoate,
4'-dodecyl-4-biphenylyl 4-(1-decyloxyethyl)-benzoate,
4'-dodecyl-4-biphenylyl 4-(1-dodecyloxyethyl)-benzoate,
4'-dodecyl-4-biphenylyl 4-(1-hexadecyloxyethyl)-benzoate,
4'-dodecyl-4-biphenylyl 4-(1-nonadecyloxyethyl)-benzoate,
4'-pentadecyl-4-biphenylyl 4-(1-methoxyethyl)-benzoate,
4'-pentadecyl-4-biphenylyl 4-(1-ethoxyethyl)-benzoate,
4'-pentadecyl-4-biphenylyl 4-(1-butoxyethyl)-benzoate,
4'-pentadecyl-4-biphenylyl 4-(1-hexyloxyethyl)-benzoate,
4'-pentadecyl-4-biphenylyl 4-(1-octyloxyethyl)-benzoate,
4'-pentadecyl-4-biphenylyl 4-(1-decyloxyethyl)-benzoate,
4'-pentadecyl-4-biphenylyl 4-(1-hexadecyloxyethyl)-benzoate,
4'-pentadecyl-4-biphenylyl 4-(1-octadecyloxyethyl)-benzoate,
4'-pentadecyl-4-biphenylyl 4-(1-eicosyloxyethyl)benzoate,
4'-propoxy-4-biphenylyl 4-(1-methoxyethyl)-benzoate,
4'-propoxy-4-biphenylyl 4-(1-ethoxyethyl)-benzoate,
4'-propoxy-4-biphenylyl 4-(1-propoxyethyl)-benzoate,
4'-propoxy-4-biphenylyl 4-(1-hexyloxyethyl)-4-(1-hexyloxyethyl)-benzoate,
4'-propoxy-4-biphenylyl 4-(1-nonyloxyethyl)-benzoate,
4'-propoxy-4-biphenylyl 4-(1-decyloxyethyl)-benzoate,
4'-propoxy-4-biphenylyl 4-(1-dodecyloxyethyl)-benzoate,
4'-propoxy-4-biphenylyl 4-(1-pentadecyloxyethyl)-benzoate,
4'-propoxy-4-biphenylyl 4-(1-octadecyloxyethyl)benzoate,
4'-propoxy-4-biphenylyl 4-(1-eicosyloxyethyl)-benzoate,
4'-butoxy-4-biphenylyl 4-(1-methoxyethyl)-benzoate,
4'-butoxy-4-biphenylyl 4-(1-ethoxyethyl)-benzoate,
4'-butoxy-4-biphenylyl 4-(1-butoxyethyl)-benzoate,
4'-butoxy-4-biphenylyl 4-(1-hexyloxyethyl)-benzoate,
4'-butoxy-4-biphenylyl 4-(1-decyloxyethyl)-benzoate,
4'-butoxy-4-biphenylyl 4-(1-dodecyloxyethyl)-benzoate,
4'-butoxy-4-biphenylyl 4-(1-hexadecyloxyethyl)-benzoate,
4'-butoxy-4-biphenylyl 4-(1-octadecyloxyethyl)-benzoate,
4'-butoxy-4-biphenyl 4-(1-eicosyloxyethyl)-benzoate,
4'-hexyloxy-4-biphenylyl 4-(1-methoxyethyl)-benzoate,
4'-hexyloxy-4-biphenylyl 4-(1-propoxyethyl)-benzoate,
4'-hexyloxy-4-biphenylyl 4-(1-pentyloxyethyl)-benzoate,
4'-hexyloxy-4-biphenylyl 4-(1-hexyloxyethyl)-benzoate,
4'-hexyloxy-4-biphenylyl 4-(1-nonyloxyethyl)-benzoate,
4'-hexyloxy-4-biphenylyl 4-(1-dodecyloxyethyl)-benzoate,
4'-hexyloxy-4-biphenylyl 4-(1-hexadecyloxyethyl)-benzoate,
4'-hexyloxy-4-biphenylyl 4-(1-octadecyloxyethyl)-benzoate,
4'-hexyloxy-4-biphenylyl 4-(1-eicosyloxyethyl)-benzoate,
4'-octyloxy-4-biphenylyl 4-(1-methoxyethyl)-benzoate,
4'-octyloxy-4-biphenylyl 4-(1-ethoxyethyl)-benzoate,
4'-octyloxy-4-biphenylyl 4-(1-propoxyethyl)-benzoate,
4'-octyloxy-4-biphenylyl 4-(1-heptyloxyethyl)-benzoate,
4'-octyloxy-4-biphenylyl 4-(1-nonyloxyethyl)-benzoate,
4'-octyloxy-4-biphenylyl 4-(1-decyloxyethyl)-benzoate,
4'-octyloxy-4-biphenylyl 4-(1-dodecyloxyethyl)-benzoate,
4'-octyloxy-4-biphenylyl 4-(1-hexadecyloxyethyl)-benzoate,
4'-octyloxy-4-biphenylyl 4-(1-octadecyloxyethyl)-benzoate,
4'-octyloxy-4-biphenylyl 4-(1-eicosyloxyethyl)-benzoate,
4'-nonyloxy-4-biphenylyl 4-(1-methoxyethyl)-benzoate, 4'-nonyloxy-4-biphenylyl 4-(1-propoxyethyl)-benzoate,
4'-nonyloxy-4-biphenylyl 4-(1-hexyloxyethyl)-benzoate,
4'-nonyloxy-4-biphenylyl 4-(1-decyloxyethyl)-benzoate,
4'-nonyloxy-4-biphenylyl 4-(1-tridecyloxyethyl)-benzoate,
4'-nonyloxy-4-biphenylyl 4-(1-hexadecyloxyethyl)-benzoate,
4'-nonyloxy-4-biphenylyl 4-(1-octadecyloxyethyl)-benzoate,
4'-nonyloxy-4-biphenylyl 4-(1-eicosyloxyethyl)-benzoate,
4'-dodecyloxy-4-biphenylyl 4-(1-methoxyethyl)-benzoate,
4'-dodecyloxy-4-biphenylyl 4-(1-ethoxyethyl)-benzoate,
4,-dodecyloxy-4-biphenylyl 4-(1-butoxyethyl)-benzoate,
4'-dodecyloxy-4-biphenylyl 4-(1-heptyloxyethyl)-benzoate,
4'-dodecyloxy-4-biphenylyl 4-(1-octyloxyethyl)-benzoate,
4'-dodecyloxy-4-biphenylyl 4-(1-dodecyloxyethyl)-benzoate,
4'-dodecyloxy-4-biphenylyl 4-(1-hexadecyloxyethyl)-benzoate,
4'-dodecyloxy-4-biphenylyl 4-(1-octadecyloxyethyl)-benzoate,
4'-dodecyloxy-4-biphenylyl 4-(1-nonadecyloxyethyl)benzoate,
4'-pentadecyloxy-4-biphenylyl 4-(1-methoxyethyl)benzoate,
4'-pentadecyloxy-4-biphenylyl 4-(1-butoxyethyl)benzoate,
4'-pentadecyloxy-4-biphenylyl 4-(1-hexyloxyethyl)-benzoate,
4'-pentadecyloxy-4-biphenylyl 4-(1-nonyloxyethyl)-benzoate,
4'-pentadecyloxy-4-biphenylyl 4-(1-decyloxyethyl)-benzoate,
4'-pentadecyloxy-4-biphenylyl 4-(1-hexadecyloxyethyl)benzoate,
4'-pentadecyloxy-4-biphenylyl 4-(1-octadecyloxyethyl)benzoate,
4'-pentadecyloxy-4-biphenylyl 4-(1-eicosyloxyethyl)-benzoate,
4'-(1-methoxyethyl)-4-biphenylyl 4-propylbenzoate,
4'-(1-ethoxyethyl)-4-biphenylyl 4-propylbenzoate,
4'-(1-propoxyethyl)-4-biphenylyl 4-propylbenzoate,
4'-(1-butoxyethyl)-4-biphenylyl 4-propylbenzoate,
4'-(1-hexyloxyethyl)-4-biphenylyl 4-propylbenzoate,
4'-(1-nonyloxyethyl)-4-biphenylyl 4-propylbenzoate,
4'-(1-dodecyloxyethyl)-4-biphenylyl 4-propylobenzoate,
4'-(1-hexadecyloxyethyl)-4-biphenylyl 4-propylbenzoate,
4'-(1-octadecyloxyethyl)-4-biphenylyl 4-propylbenzoate,
4'-(1-eicosyloxyethyl)-4-biphenylyl 4-propylbenzoate,
4'-(1-methoxyethyl)-4-biphenylyl 4-butylbenzoate,
4'-(1-ethoxyethyl)-4-biphenylyl 4-butylbenzoate,
4'-(1-butoxyethyl)-4-biphenylyl 4-butylbenzoate,
4'-(1-hexyloxyethyl)-4-biphenylyl 4-butylbenzoate,
4'-(1-octyloxyethyl)-4-biphenylyl 4-butylbenzoate,
4'-(1-decyloxyethyl)-4-biphenylyl 4-butylbenzoate,
4'-(1-dodecyloxyethyl)-4-biphenylyl 4-butylbenzoate,
4'-(1-hexadecyloxyethyl)-4-biphenylyl 4-butylbenzoate,
4'-(1-octadecyloxyethyl)-4-biphenylyl 4-butylbenzoate,
4'-(1-eicosyloxyethyl)-4-biphenylyl 4-butylbenzoate,
4'-(1-methoxyethyl)-4-biphenylyl 4-hexylbenzoate,
4'-(1-butoxyethyl)-4-biphenylyl 4-hexylbenzoate,
4'-(1-hexyloxyethyl)-4-biphenylyl 4-hexylobenzoate,
4'-(1-octyloxyethyl)-4-biphenylyl 4-hexylbenzoate,
4'-(1-decyloxyethyl)-4-biphenylyl 4-hexylbenzoate,
4'-(1-hexadecyloxyethyl)-4-biphenylyl 4-hexylbenzoate,
4'-(1-octadecyloxyethyl)-4-biphenylyl 4-hexylbenzoate,
4'-(1-methoxyethyl)-4-biphenylyl 4-octylbenzoate,
4'-(1-propoxyethyl)-4-biphenylyl 4-octylbenzoate,
4'-(1-hexyloxyethyl)-4-biphenylyl 4-octylbenzoate,
4'-(1-octyloxyethyl)-4-biphenylyl 4-octylbenzoate,
4'-(1-decyloxyethyl)-4-biphenylyl 4-octylbenzoate,
4'-(1-dodecyloxyethyl)-4-biphenylyl 4-octylbenzoate,
4'-(1-hexadecyloxyethyl)-4-biphenylyl 4-octylbenzoate,
4'-(1-octadecyloxyethyl)-4-biphenylyl 4-octylbenzoate,
4'-(1-eicosyloxyethyl)-4-biphenylyl 4-octylbenzoate,
4'-(1-methoxyethyl)-4-biphenylyl 4-dodecylbenzoate,
4'-(1-butoxyethyl)-4-biphenylyl 4-dodecylbenzoate,
4'-(1-octyloxyethyl)-4-biphenylyl 4-dodecylbenzoate,
4'-(1-decyloxyethyl)-4-biphenylyl 4-dodecylbenzoate,
4'-(1-hexadecyloxyethyl)-4-biphenylyl 4-dodecylbenzoate,
4'-(1-octadecyloxyethyl)-4-biphenylyl 4-dodecylbenzoate,
4'-(1-methoxyethyl)-4-biphenylyl 4-pentadecylbenzoate,
4'-(1-butoxyethyl)-4-biphenylyl 4-pentadecylbenzoate,
4'-(1-hexyloxyethyl)-4-biphenylyl 4-pentadecylbenzoate,
4'-(1-octyloxyethyl)-4-biphenylyl 4-pentadecylbenzoate,
4'-(1-decyloxyethyl)-4-biphenylyl 4-pentadecylbenzoate,
4'-(1-hexadecyloxyethyl)-4-biphenylyl 4-pentadecylbenzoate,
4'-(1-octadecyloxyethyl)-4-biphenylyl 4pentadecylbenzoate,
4'-(1-eicosyloxyethyl)-4-biphenylyl 4-pentadecylbenzoate,
4'-(1-methoxyethyl)-4-biphenylyl 4-propyloxybenzoate,
4'-(1-ethoxyethyl)-4-biphenylyl 4-propyloxybenzoate,
4'-(1-propoxyethyl)-4-biphenylyl 4-propyloxybenzoate,
4'-(1-butoxyethyl)-4-biphenylyl 4-propyloxybenzoate,
4'-(1-hexyloxyethyl)-4-biphenylyl 4-propyloxybenzoate,
4'-(1-octyloxyethyl)-4-biphenylyl 4-propyloxybenzoate,
4,-(1-nonyloxyethyl)-4-biphenylyl 4-propyloxybenzoate,
4'-(1-dodecyloxyethyl)-4-biphenylyl 4-propyloxybenzoate, 4'-(1-hexadecyloxyethyl)-4-biphenylyl 4-propyloxybenzoate,
4'-(1-octadecyloxyethyl)-4-biphenylyl 4-propyloxybenzoate,
4'-(1-eicosyloxyethyl)-4-biphenylyl 4-propyloxybenzoate,
4'-(1-methoxyethyl)-4-biphenylyl 4-butyloxybenzoate,
4'-(1-propoxyethyl)-4-biphenylyl 4-butyloxybenzoate,
4'-(1-hexyloxyethyl)-4-biphenylyl 4-butyloxybenzoate,
4'-(1-nonyloxyethyl)-4-biphenylyl 4-butyloxybenzoate,
4'-(1-hexadecyloxyethyl)-4-biphenylyl 4-butyloxybenzoate,
4'-(1-octadecyloxyethyl)-4-biphenylyl 4-butyloxybenzoate,
4'-(1-eicosyloxyethyl)-4-biphenylyl 4-butyloxybenzoate,
4'-(1-methoxyethyl)-4-biphenylyl 4-hexyloxybenzoate,
4'-(1-ethoxyethyl)-4-biphenylyl 4-hexyloxybenzoate,
4'-(1-butoxyethyl)-4-biphenylyl 4-hexyloxybenzoate,
4'-(1-hexyloxyethyl)-4-biphenylyl 4-hexyloxybenzoate,
4'-(1-octyloxyethyl)-4-biphenylyl 4-hexyloxybenzoate,
4'-(1-decyloxyethyl)-4-biphenylyl 4-hexyloxybenzoate,
4'-(1-dodecyloxyethyl)-4-biphenylyl 4-hexyloxybenzoate,
4'-(1-hexadecyloxyethyl)-4-biphenylyl-4-hexyloxybenzoate,
4'-(1-octadecyloxyethyl)-4-biphenylyl-4-hexyloxybenzoate,
4'-(1-methoxyethyl)-4-biphenylyl 4-nonyloxybenzoate,
4'-(1-propoxyethyl)-4-biphenylyl 4-nonyloxybenzoate,
4'-(1-hexyloxyethyl)-4-biphenylyl 4-nonyloxybenzoate,
4'-(1-octyloxyethyl)-4-biphenylyl 4-nonyloxybenzoate,
4'-(1-dodecyloxyethyl)-4-biphenylyl 4-nonyloxybenzoate,
4'-(1-hexadecyloxyethyl)-4-biphenylyl-4nonyloxybenzoate,
4'-(1-octadecyloxyethyl)-4-biphenylyl-4-nonyloxybenzoate,
4,-(1-eicosyloxyethyl)-4-biphenylyl 4-nonyloxybenzoate,
4'-(1-methoxyethyl)-4-biphenylyl 4-decyloxybenzoate,
4'-(1-propoxyethyl)-4-biphenylyl 4-decyloxybenzoate,
4'-(1-butoxyethyl)-4-biphenylyl 4-decyloxybenzoate,
4'-(1-hexyloxyethyl)-4-biphenylyl 4-decyloxybenzoate,
4'-(1-octyloxyethyl)-4-biphenylyl 4-decyloxybenzoate,
4'-(1-decyloxyethyl)-4-biphenylyl 4-decyloxybenzoate,
4'-(1-hexadecyloxyethyl)-4-biphenylyl-4-decyloxybenzoate,
4'-(1-nonadecyloxyethyl)-4-biphenylyl-4-decyloxybenzoate,
4'-(1-eicosyloxyethyl)-4-biphenylyl 4-decyloxybenzoate,
4'-(1-methoxyethyl)-4-biphenylyl 4-dodecyloxybenzoate,
4'-(1-ethoxyethyl)-4-biphenylyl 4-dodecyloxybenzoate,
4'-(1-butoxyethyl)-4-biphenylyl 4-dodecyloxybenzoate,
4'-(1-pentyloxyethyl)-4-biphenylyl 4-dodecyloxybenzoate,
4'-(1-heptyloxyethyl)-4-biphenylyl 4-dodecyloxybenzoate,
4'-(1-nonyloxyethyl)-4-biphenylyl 4-dodecyloxybenzoate,
4'-(1-decyloxyethyl)-4-biphenylyl 4-dodecyloxybenzoate,
4'-(1-dodecyloxyethyl)-4-biphenylyl 4-dodecyloxybenzoate,
4'-(1-hexadecyloxyethyl)-4-biphenylyl 4-dodecyloxybenzoate,
4'-(1-octadecyloxyethyl)-4-biphenylyl 4-dodecyloxybenzoate,
4'-(1-eicosyloxyethyl)-4-biphenylyl 4-dodecyloxybenzoate,
4'-(1-methoxyethyl)-4-biphenylyl 4-pentadecyloxybenzoate,
4'-(1-ethoxyethyl)-4-biphenylyl 4-pentadecyloxybenzoate,
4'-(1-butoxyethyl)-4-biphenylyl 4-pentadecyloxybenzoate,
4'-(1-hexyloxyethyl)-4-biphenylyl 4-pentadecyloxybenzoate,
4'-(1-nonyloxyethyl)-4-biphenylyl 4-pentadecyloxybenzoate,
4'-(1-hexadecyloxyethyl)-4-biphenylyl 4-pentadecyloxybenzoate,
4'-(1-octadecyloxyethyl)-4-biphenylyl 4-pentadecyloxybenzoate,
4'-(1-eicosyloxyethyl)-4-biphenylyl 4-pentadecyloxybenzoate,
4-(1-methoxyethyl)phenyl 4-(4-propylphenyl)-benzoate,
4-(1-ethoxyethyl)phenyl 4-(4-propylphenyl)-benzoate,
4-(1-propoxyethyl)phenyl 4-(4-propylphenyl)-benzoate,
4-(1-butoxyethyl)phenyl 4-(4-propylphenyl)-benzoate,
4-(1-hexyloxyethyl)phenyl 4-(4-propylphenyl)-benzoate,
4-(1-octyloxyethyl)phenyl 4-(4-propylphenyl)-benzoate,
4-(1-decyloxyethyl)phenyl 4-(4-propylphenyl)-benzoate,
4-(1-dodecyloxyethyl)phenyl 4-(4-propylphenyl)-benzoate,
4-(1-hexadecyloxyethyl)phenyl 4-(4-propylphenyl)-benzoate,
4-(1-octadecyloxyethyl)phenyl 4-(4-propylphenyl)-benzoate,
4-(1-eicosyloxyethyl)phenyl 4-(4-propylphenyl)-benzoate,
4-(1-methoxyethyl)phenyl 4-(4-butylphenyl)-benzoate,
4-(1-propoxyethyl)phenyl 4-(4-butylphenyl)-benzoate,
4-(1-butoxyethyl)phenyl 4-(4-butylphenyl)-benzoate, 4-(1-heptyloxyethyl)phenyl 4-(4-butylphenyl)-benzoate,
4-(1-nonyloxyethyl)phenyl 4-(4-butylphenyl)-benzoate,
4-(1-hexadecyloxyethyl)phenyl 4-(4-butylphenyl)-benzoate,
4-(1-octadecyloxyethyl)phenyl 4-(4-butylphenyl)-benzoate,
4-(1-eicosyloxyethyl)phenyl 4-(4-butylphenyl)-benzoate,
4-(1-methoxyethyl)phenyl 4-(4-hexylphenyl)-benzoate,
4-(1-propoxyethyl)phenyl 4-(4-hexylphenyl)-benzoate,
4-(1-hexyloxyethyl)phenyl 4-(4-hexylphenyl)-benzoate,
4-(1-octyloxyethyl)phenyl 4-(4-hexylphenyl)-benzoate,
4-(1-decyloxyethyl)phenyl 4-(4-hexylphenyl)-benzoate,
4-(1-dodecyloxyethyl)phenyl 4-(4-hexylphenyl)-benzoate,
4-(1-hexadecyloxyethyl)phenyl 4-(4-hexylphenyl)-benzoate,
4-(1-nonadecyloxyethyl)phenyl 4-(4-hexylphenyl)-benzoate,
4-(1-methoxyethyl)phenyl 4-(4-nonylphenyl)-benzoate,
4-(1-propoxyethyl)phenyl 4-(4-nonylphenyl)-benzoate,
4-(1-butoxyethyl)phenyl 4-(4-nonylphenyl)-benzoate,
4-(1-heptyloxyethyl)phenyl 4-(4-nonylphenyl)-benzoate,
4-(1-nonyloxyethyl)phenyl 4-(4-nonylphenyl)-benzoate,
4-(1-dodecyloxyethyl)phenyl 4-(4-nonylphenyl)-benzoate,
4-(1-hexadecyloxyethyl)phenyl 4-(4-nonylphenyl)-benzoate,
4-(1-octadecyloxyethyl)phenyl 4-(4-nonylphenyl)-benzoate,
4-(1-eicosyloxyethyl)phenyl 4-(4-nonylphenyl)-benzoate,
4-(1-methoxyethyl)phenyl 4-(4-dodecylphenyl)-benzoate,
4-(1-propoxyethyl)phenyl 4-(4-dodecylphenyl)-benzoate,
4-(1-butoxyethyl)phenyl 4-(4-dodecylphenyl)-benzoate,
4-(1-pentyloxyethyl)phenyl 4-(4-dodecylphenyl)-benzoate,
4-(1-octyloxyethyl)phenyl 4-(4-dodecylphenyl)-benzoate,
4-(1-nonyloxyethyl)phenyl 4-(4-dodecylphenyl)-benzoate,
4-(1-dodecyloxyethyl)phenyl 4-(4-dodecylphenyl)-benzoate,
4-(1-pentadecyloxyethyl)phenyl 4-(4-dodecylphenyl)benzoate,
4-(1-octadecyloxyethyl)phenyl 4-(4-dodecylphenyl)-benzoate,
4-(1-eicosyloxyethyl)phenyl 4-(4-dodecylphenyl)-benzoate,
4-(1-methoxyethyl)phenyl 4-(4-pentadecylphenyl)-benzoate,
4-(1-ethoxyethyl)phenyl 4-(4-pentadecylphenyl)-benzoate,
4-(1-butoxyethyl)phenyl 4-(4-pentadecylphenyl)-benzoate,
4-(1-hexyloxyethyl)phenyl 4-(4-pentadecylphenyl)-benzoate,
4-(1-heptyloxyethyl)phenyl 4-(4-pentadecylphenyl)-benzoate,
4-(1-nonyloxyethyl)phenyl 4-(4-pentadecylphenyl)-benzoate,
4-(1-decyloxyethyl)phenyl 4-(4-pentadecylphenyl)-benzoate,
4-(1-dodecyloxyethyl)phenyl 4-(4-pentadecylphenyl)benzoate,
4-(1-hexadecyloxyethyl)phenyl 4-(4-pentadecylphenyl)benzoate,
4-(1-octadecyloxyethyl)phenyl 4-(4-pentadecylphenyl)benzoate,
4-(1-eicosyloxyethyl)phenyl 4-(4-pentadecylphenyl)-benzoate,
4-(1-methoxyethyl)phenyl 4-(4-propyloxyphenyl)-benzoate,
4-(1-ethoxyethyl)phenyl 4-(4-propyloxyphenyl)-benzoate,
4-(1-propoxyethyl)phenyl 4-(4-propyloxyphenyl)-benzoate,
4-(1-butoxyethyl)phenyl 4-(4-propyloxyphenyl)-benzoate,
4-(1-hexyloxyethyl)phenyl 4-(4-propyloxyphenyl)-benzoate,
4-(1-octyloxyethyl)phenyl 4-(4-propyloxyphenyl)-benzoate,
4-(1-decyloxyethyl)phenyl 4-(4-propyloxyphenyl)-benzoate,
4-(1-dodecyloxyethyl)phenyl 4-(4-propyloxyphenyl)-benzoate,
4-(1-hexadecyloxyethyl)phenyl 4-(4-propyloxyphenyl)benzoate,
4-(1-octadecyloxyethyl)phenyl 4-(4-propyloxyphenyl)benzoate,
4-(1-nonadecyloxyethyl)phenyl 4-(4-propyloxyphenyl)benzoate,
4-(1-methoxyethyl)phenyl 4-(4-butyloxyphenyl)-benzoate,
4-(1-propoxyethyl)phenyl 4-(4-butyloxyphenyl)-benzoate,
4-(1-butoxyethyl)phenyl 4-(4-butyloxyphenyl)-benzoate,
4-(1-hexyloxyethyl)phenyl 4-(4-butyloxyphenyl)-benzoate,
4-(1-nonyloxyethyl)phenyl 4-(4-butyloxyphenyl)-benzoate,
4-(1-hexadecyloxyethyl)phenyl 4-(4-butyloxyphenyl)benzoate,
4-(1-octadecyloxyethyl)phenyl 4-(4-butyloxyphenyl)-benzoate,
4-(1-eicosyloxyethyl)phenyl 4-(4-butyloxyphenyl)-benzoate,
4-(1-methoxyethyl)phenyl 4-(4-hexyloxyphenyl)-benzoate,
4-(1-ethoxyethyl)phenyl 4-(4-hexyloxyphenyl)-benzoate,
4-(1-butoxyethyl)phenyl 4-(4-hexyloxyphenyl)-benzoate,
4-(1-hexyloxyethyl)phenyl 4-(4-hexyloxyphenyl)-benzoate,
4-(1-octyloxyethyl)phenyl 4-(4-hexyloxyphenyl)-benzoate,
4-(1-dodecyloxyethyl)phenyl 4-(4-hexyloxyphenyl)-benzoate, 4-(1-hexadecyloxyethyl)phenyl 4-(4-hexyloxyphenyl)benzoate,
4-(1-octadecyloxyethyl)phenyl 4-(4-hexyloxyphenyl)benzoate,
4-(1-eicosyloxyethyl)phenyl 4-(4-hexyloxyphenyl)benzoate,
4-(1-methoxyethyl)phenyl 4-(4-octyloxyphenyl)-benzoate,
4-(1-propoxyethyl)phenyl 4-(4-octyloxyphenyl)-benzoate,
4-(1-hexyloxyethyl)phenyl 4-(4-octyloxyphenyl)-benzoate,
4-(1-octyloxyethyl)phenyl 4-(4-octyloxyphenyl)-benzoate,
4-(1-decyloxyethyl)phenyl 4-(4-octyloxyphenyl)-benzoate,
4-(1-dodecyloxyethyl)phenyl 4-(4-octyloxyphenyl)-benzoate,
4-(1-hexadecyloxyethyl)phenyl 4-(4-octyloxyphenyl)benzoate,
4-(1-octadecyloxyethyl)phenyl 4-(4-octyloxyphenyl)-benzoate,
4-(1-nonadecyloxyethyl)phenyl 4-(4-octyloxyphenyl)benzoate,
4-(1-methoxyethyl)phenyl 4-(4-decyloxyphenyl)-benzoate,
4-(1-ethoxyethyl)phenyl 4-(4-decyloxyphenyl)-benzoate,
4-(1-butoxyethyl)phenyl 4-(4-decyloxyphenyl)-benzoate,
4-(1-hexyloxyethyl)phenyl 4-(4-decyloxyphenyl)-benzoate,
4-(1-octyloxyethyl)phenyl 4-(4-decyloxyphenyl)-benzoate,
5 4-(1-nonyloxyethyl)phenyl 4-(4-decyloxyphenyl)-benzoate,
4-(1-dodecyloxyethyl)phenyl 4-(4-decyloxyphenyl)-benzoate,
4-(1-octadecyloxyethyl)phenyl 4-(4-decyloxyphenyl)benzoate,
4-(1-eicosyloxyethyl)phenyl 4-(4-decyloxyphenyl)-benzoate,
4-(1-methoxyethyl)phenyl 4-(4-dodecyloxyphenyl)-benzoate,
4-(1-propoxyethyl)phenyl 4-(4-dodecyloxyphenyl)-benzoate,
4-(1-butoxyethyl)phenyl 4-(4-dodecyloxyphenyl)-benzoate,
4-(1-hexyloxyethyl)phenyl 4-(4-dodecyloxyphenyl)-benzoate,
4-(1-heptyloxyethyl)phenyl 4-(4-dodecyloxyphenyl)-benzoate,
4-(1-nonyloxyethyl)phenyl 4-(4-dodecyloxyphenyl)-benzoate,
4-(1-decyloxyethyl)phenyl 4-(4-dodecyloxyphenyl)-benzoate,
4-(1-dodecyloxyethyl)phenyl 4-(4-dodecyloxyphenyl)benzoate,
4-(1-hexadecyloxyethyl)phenyl 4-(4-dodecyloxyphenyl)benzoate,
4-(1-nonadecyloxyethyl)phenyl 4-(4-dodecyloxyphenyl)benzoate,
4-(1-methoxyethyl)phenyl 4-(4-pentadecyloxyphenyl)benzoate,
4-(1-propoxyethyl)phenyl 4-(4-pentadecyloxyphenyl)benzoate,
4-(1-pentyloxyethyl)phenyl 4-(4-pentadecyloxyphenyl)benzoate,
4-(1-hexyloxyethyl)phenyl 4-(4-pentadecyloxyphenyl)benzoate,
4-(1-octyloxyethyl)phenyl 4-(4-pentadecyloxyphenyl)benzoate,
4-(1-decyloxyethyl)phenyl 4-(4-pentadecyloxyphenyl)benzoate,
4-(1-hexadecyloxyethyl)phenyl 4-(4-pentadecyloxyphenyl)benzoate,
4-(1-octadecyloxyethyl)phenyl 4-(4-pentadecyloxyphenyl)benzoate,
4-(1-eicosyloxyethyl)phenyl 4-(4-pentadecyloxyphenyl)benzoate, The optical active ether derivative I including such compounds as enumerated as above is available for liquid crystal materials.

In use as a liquid crystal material, said optically active ether derivatives (I) are usually mixed with one or more other types of liquid crystal compounds although said derivatives (I) may be used singly.

The other types of liquid crystal compounds to be mixed and their mixing ratio are properly selected according to the purpose of use and not specified.

Such liquid crystal material can be effectively utilized for producing an optical switching element by a known method.

The liquid crystal materials according to this invention can be applied to the display devices of both birefringence display system and gest-host display system, but they are more suited for the gest-host display system where a material with a large tilt angle is required. For the preparation of such liquid crystal material, those of the optically active ether derivatives (I) of this invention in which the substituent X is —OCO— are preferably used. The compounds of the formula (I) where the substituent X is —COO— are preferably used for the preparation of liquid crystal materials suited for application to the birefringence display system. Use of the liquid crystal compositions of this invention is of course not limited to said two display systems; they can as well be used for all known display systems.

The compounds of the formula (I) wherein X is —COO—, l=2 and m=1 are more advantageous because Sc* phase may be taken thereby in a wide temperature range of from lower to higher temperatures, and they are preferably available because a liquid crystal temperature range of liquid crystal materials can be enlarged by mixing said compounds.

The optically active ether derivatives of this invention are used either singly or in a mixtures as liquid crystal compounds. Mixing of such derivatives can expand the usable temperature range of ferroelectric liquid crystals without affecting their ferroelectricity.

As described above, in accordance with this invention, the novel optically active ether derivatives represented by the formula (I) can be easily obtained in a high yield. These optically active ether derivatives have very excellent properties as liquid crystal compounds, so that they can be effectively utilized for preparing the liquid crystal materials and the optical switching elements can be produced by utilizing such liquid crystal materials.

PREFERRED EMBODIMENTS OF THE INVENTION

The present invention will hereinafter be described in accordance with the examples of the invention.

Example 1

An acid chloride prepared from 2.50 g (10 mmol) of (+)-4-(1-hexyloxyethyl)benzoic acid and oxalyl chloride was added into a solution comprising 3.58 g (12 mmol) of 4'-octyloxy-4-hydroxybiphenyl, 10 g of pyridine and 30 g of dichloroethane at room temperature. The mixed solution was stirred at the same temperature for 5 hours and then at 50° C. for 3 hours. After the end of the reaction, the reaction mixture was extracted with 30 g of dichloroethane and washed with water, a 1N hydrochloric acid solution, a 2% sodium carbonate solution and water successively in that order. The dichloroethane layer was concentrated under reduced pressure and the solvent was distilled off. The resulting white solid was purified by silica gel column chromatography to obtain 5.09 g of (+)-4'-(octyloxy)-4-biphenyl 4-(1-hexyloxyethyl)-benzoate in a 96% yield.

Further purification of the product was made by recrystallization from ethanol. Optical rotation $[\alpha]_D^{20} = +37.4°$ (c=1, CHCl$_3$).

Example 2

The procedure of Example 1 was followed except that 2.08 g of (+)-4-(1-propyloxyethyl)benzoic acid was used in place of (+)-4-(1-hexyloxyethyl)benzoic acid to obtain 4.61 9 (94.5% yield) of (+)-4'-(octyloxy)-4biphenylyl 4-(1-propyloxyethyl)-benzoate. $[\alpha]_D^{20} = +41.0°$ (c=1, CHCl$_3$).

Example 3

The procedure of Example 1 was followed except that 1.8 g of (+)-4-(1-methoxyethyl)benzoic acid was used in place of (+)-4-(1-hexyloxyethyl)benzoic acid to obtain 4.37 g (95% yield) of (+)-4'-(octyloxy)-4-biphenyl 4- (1-methoxyethyl)-benzoate, $[\alpha]_D^{20} = +48.5°$ (c=1, CHCl$_3$).

Examples 4-14

The compounds shown in Table 1 were obtained by following the procedure of Example 1. The phase transition temperatures of the respective compounds are shown in Table 1.

The phase transition temperatures of the compounds obtained in Examples 1 to 3 are also shown in Table 1.

Example 15

3.37 g (10 mmol) of (+)-4'-(1-hexyloxyethyl)-4-biphenylcarboxylic acid and 2.27 g (12 mmol) of 4-octyloxyphenol were dissolved in 50 ml of dry dichloromethane, followed by addition thereto of 3.09 g (15 mmol) of dicyclohexylcarbodiimide and 0.1 g of 4-pyrrolidinopyridine and stirring at room temperature for 6 hours.

After the end of the reaction, the produced white precipitate was filtered out and the organic layer was added with 150 g of dichloromethane and washed with water, a 5% acetic acid solution, water, a 5% sodium bicarbonate solution and water successively in that order.

The dichloromethane layer was concentrated under reduced pressure and the resulting white solid residue was purified by silica gel column chromatography to obtain 4.88 g of (+)-4-octyloxyphenyl 4'-(1-hexyloxyethyl)-4-biphenylcarboxylate in a 92% yield.

Further purification was made by recrystallization from ethanol. $[\alpha]_D^{20} = +38.1°$ (c=1, CHCl$_3$).

Examples 16-20

The compounds shown in Table 2 were obtained by following the procedure of Example 15. The phase transition temperatures of these compounds are also shown in Table 2. (The phase transition temperature of the objective compound obtained in Example 15 is also shown in Table 2).

Example 21

An acid chloride prepared from 1.80 g (10 mmol) of (−)-4-(1-methoxyethyl)benzoic acid and oxalyl chloride was added to a solution comprising 2.66 g (12 mmol) of 4-(octyloxy)phenol, 10 g of pyridine and 30 g of toluene at room temperature. The mixed solution was stirred at the same temperature for one hour and then at 40° C. -50° C. for 2 hours. The resulting reaction mixture was treated and purified according to Example 1 to obtain 3.78 g (98.5% yield) of (−)-4-(octyloxy)phenyl 4-(1-methoxyethyl)-benzoate. $[\alpha]_D^{20} = -57.7°$ (c=1, CHCl$_3$).

Example 22

The procedure of Example 21 was followed except that 2.08 g of (−)-4-(1-propyloxy)benzoic acid was used in place of (−)-4-(1-methoxyethyl)benzoic acid to obtain 3.98 g (96.5% yield) of (−)-4-(octyloxy)phenyl 4-(1-propyloxyethyl)-benzoate. $[\alpha]_D^{20} = -48.3°$ (c=1, CHCl$_3$).

Examples 23-25

The compounds shown in Table 3 were obtained by following the procedure of Example 21. The optical rotations of these compounds are also shown in Table 3.

Example 26

1.52 g (10 mmol) of (+)-4-(1-methoxyethyl)phenol was dissolved in 50 ml of anhydrous pyridine, followed by dropwise addition thereto of a 10 ml dichloromethane solution of 4.14 g (12 mmol) of 4'-octyloxy-4-biphenylcarboxylic acid chloride.

After said dropwise addition, the solution was stirred at 40° C.–50° C. for 3 hours and the resulting reaction solution was poured into 200 ml of 3N hydrochloric acid. The mixed solution was extracted by adding 200 ml of toluene and the toluene layer was washed with a 1N hydrochloric acid solution, water, a 5% sodium bicarbonate solution and water successively in that order and then concentrated under reduced pressure. The resulting white solid was purified by silica gel column chromatography to obtain 4.37 g (95% yield) of (+)-4-(1-methoxyethyl)phenyl 4'-octyloxybiphenylcarboxylate.

The product was recrystallized from ethanol for further purification. $[\alpha]_D^{20} = +49.9°$ (c=1, CHCl$_3$).

Examples 27-42

The compounds shown in Table 4 were obtained by following the process of Example 26. The phase transition temperatures of these compounds are also shown in Table 4. (The phase transition temperature of the objective compound obtained in Example 26 is also shown in Table 4).

Example 43

The procedure of Example 26 was followed except for use of (−)-4-(1-methoxyethyl)phenol in place of (+)-4-(1-methoxyethyl)phenol and 4-octyloxybenzoic acid chloride in place of 4'-octyloxy-4-biphenylcarboxylic acid chloride to obtain (−)-4-(1-methoxyethyl)-phenyl 4-octyloxybenzoate. $[\alpha]_D^{20} = -57.5°$ (c=1, CHCl$_3$).

Example 44

The procedure of Example 26 was followed except for use of (+)-4-(1-hexadecyloxyethyl)phenol in place of (+)-4-(1-methoxyethyl)phenol and 4-octyloxybenzoic acid chloride in place of 4'-octyloxy-4-biphenylcarboxylic acid chloride to obtain (+)-4-(1-hexadecyloxyethyl)phenyl 4-octyloxy-benzoate. $[\alpha]_D^{20} = +35.9°$ (c=1, CHCl$_3$).

Example 45

The procedure of Example 26 was followed except for use of (+)-4-(1-(6-(S)-methyloctyloxy)ethyl)phenol in place of (+)-4-(1-methoxyethyl)phenol and 4-octyloxybenzoic acid chloride in place of 4'-octyloxy-4-biphenylcarboxylic acid chloride to obtain (+)-4-(1-(6(S)-methyloctyloxy)ethyl)phenyl 4-octyloxy-benzoate. $[\alpha]_D^{20} = +44.0°$ (c=1, CHCl$_3$)

The tilt angles of some of the compounds obtained in said examples are shown in Table 5.

Examples 46–49

The liquid crystal compositions shown in Table 6 were prepared by using the liquid crystal compounds. For the preparation, weighed amounts of the specified compounds were mixed while heating and melting them in a sample tube.

Production of liquid crystal element

A polyimide type polymer film was formed on the glass substrates provided with indium oxide transparent electrodes. After lapping with a gauze in a given direction, the two substrates were combined with glass fibers (6 μm in diameter) placed therebetween as spacer so that the lapped directions of said substrates would coincide with each other to thereby assemble a liquid crystal cell. Then each of said liquid crystal compositions was encapsulated in the evacuated liquid crystal cell to make a liquid crystal element.

This liquid crystal element was combined with a polarizer, and by applying an electric field of 20 V, the change of intensity of transmitted light was examined. The results are shown in Table 6.

As seen from these results, a higher tilt angle can be obtained by using the liquid crystal compositions of this invention than obtainable with the composition of comparative example, and this leads to the improvement of contrast ratio. In each of the liquid crystal compositions of the Examples and Comparative Examples shown in Table 6, 3% by weight of a dichromic dye LSB-235 (made by Mitsubishi Kasei K. K.) was dissolved.

TABLE 1

| Example No. | Compound of formula (I) l: 2, X: —OOC—, m: 1 A | R | Phase transition temperature (°C.) |
|---|---|---|---|
| 1 | C$_8$H$_{17}$O | C$_6$H$_{13}$ | K —94→ Sc* —100→ I |
| 2 | " | C$_3$H$_7$ | K —101→ Sc* —108→ Ch —111→ I |
| 3 | " | CH$_3$ | K —118→ Ch —128→ I; 98 ↘ Sc* ↗ 113 |
| 4 | " | C$_{10}$H$_{21}$ | K —91→ I; ↘76 Sc* |
| 5 | " | C$_{12}$H$_{25}$ | K —89→ I; ↘76 Sc* |
| 6 | " | C$_2$H$_5$O(CH$_2$)$_3$ | K —88→ Sc* —89→ Ch —90→ I |
| 7 | C$_6$H$_{13}$O | C$_6$H$_{13}$ | K —93→ S$_1$ —101→ Ch —102→ I; ↙83 S$_2$ |
| 8 | " | C$_2$H$_5$O(CH$_2$)$_3$ | K —85→ S$_1$ —87→ Ch —93→ I; ↙90 S$_2$ |
| 9 | C$_{12}$H$_{25}$O | C$_6$H$_{13}$ | K —91→ Sc* —97→ I |
| 10 | " | C$_2$H$_5$O(CH$_2$)$_3$ | K —79→ Sc* —84→ I |
| 11 | C$_{12}$H$_{25}$O | C$_{12}$H$_{25}$ | K —82→ I; 72 ↘ Sc* ↗ 78 |
| 12 | C$_{10}$H$_{21}$ | C$_6$H$_{13}$ | K —50→ Sc* —61→ I |
| 13 | C$_{10}$H$_{21}$O | C$_{10}$H$_{21}$ | K —86→ I; 72 ↘ Sc* ↗ 83 |
| 14 | " | CH$_2$—CH—C$_2$H$_5$ \| CH$_3$ (s) | K —89→ Sc* —95→ I |

Note: S$_1$ and S$_2$ indicate unidentified phases.

TABLE 2

| Example No. | Compound of formula (I) l: 1, X: —OOC—, m: 2 A | R | Phase transition temperature (°C.) |
|---|---|---|---|
| 15 | C$_8$H$_{17}$O | C$_6$H$_{13}$ | K —66→ Sc* —72→ Ch —76→ I |
| 16 | " | C$_8$H$_{17}$ | K —64→ Sc* —71→ Ch —75→ I |
| 17 | C$_{12}$H$_{25}$O | C$_6$H$_{13}$ | K —66→ Sc* —73→ Ch —76→ I |
| 18 | C$_8$H$_{17}$O | C$_3$H$_7$ | K —70→ Ch —80→ I |
| 19 | " | C$_{12}$H$_{25}$ | K —64→ Sc* —69→ Ch —73→ I |
| 20 | C$_8$H$_{17}$ | C$_6$H$_{13}$ | K —33→ Sc* —38→ I |

TABLE 3

| Example No. | Compound of formula (I) l: 1, X: —OOC—, m: 1 | | Optical rotation |
|---|---|---|---|
| | A | R | |
| 23 | $C_8H_{17}O$ | $C_6H_{13}$ | −48.5° |
| 24 | $C_{10}H_{21}O$ | $C_{10}H_{21}$ | −40.1° |
| 25 | $C_{14}H_{29}O$ | $C_6H_{13}$ | −39.2° |

TABLE 4 (1)

| Example No. | Compound of formula (I) l: 2, X: —COO—, m: 1 | | Phase transition temperature (°C) |
|---|---|---|---|
| | A | R | |
| 26 | $C_8H_{17}O$ | $CH_3$ | $K \xrightarrow{86} Sc^* \xrightarrow{95} S_A \xrightarrow{145} I$ |
| 27 | " | $C_3H_7$ | $K \xrightarrow{64} Sc^* \xrightarrow{98} S_A \xrightarrow{128} I$ |
| 28 | " | $C_6H_{13}$ | $K \xrightarrow{46} Sc^* \xrightarrow{71} S_A \xrightarrow{110} I$ |
| 29 | " | $C_8H_{17}$ | $K \xrightarrow{44} Sc^* \xrightarrow{82} S_A \xrightarrow{110} I$ |
| 30 | " | $C_{12}H_{25}$ | $K \xrightarrow{} Sc^* \xrightarrow{64} S_A \xrightarrow{93} I$ |
| 31 | " | $C_2H_5O(CH_2)_3$ | $K \xrightarrow{} Sc^* \xrightarrow{73} S_A \xrightarrow{106} I$ |
| 32 | " | $CH_3OC_2H_4$ | $K \xrightarrow{} Sc^* \xrightarrow{73} S_A \xrightarrow{116} I$ |
| 33 | $C_{10}H_{21}O$ | $C_6H_{13}$ | $K \xrightarrow{45.6} Sc \xrightarrow{97} S_A \xrightarrow{113} I$ |
| 34 | $C_9H_{19}$ | $C_6H_{13}$ | $K \xrightarrow{43.5} S_A \xrightarrow{74} I$ |

TABLE 4 (2)

| Example No. | Compound of formula (I) l: 1, X: —COO—, m: 2 | | Phase transition temperature (°C) |
|---|---|---|---|
| | A | R | |
| 35 | $C_8H_{17}O$ | $CH_3$ | $K \xrightarrow{91} S_A \xrightarrow{119} I$ ; $S_1$ at 93 |
| 36 | " | $C_3H_7$ | $K \xrightarrow{78} S_A \xrightarrow{94} Ch \xrightarrow{97} I$ ; $S_1$ |
| 37 | " | $C_6H_{13}$ | $K \xrightarrow{59} S_A \xrightarrow{90} I$ ; $S_1$ at 48 |
| 38 | " | $C_8H_{17}$ | $K \xrightarrow{53} S_A \xrightarrow{88} I$ ; $S_1$ at 42 |
| 39 | " | $C_3H_6OC_2H_5$ | $K \xrightarrow{50} S_A \xrightarrow{70} I$ ; $S_1$ |
| 40 | $C_{10}H_{21}$ | $C_6H_{13}$ | $K \xrightarrow{51} I$ ; $S_A$ at 50 |
| 41 | $C_8H_{17}$ | $CH_3$ | $K \xrightarrow{88} I$ ; $S_A$ at 78 |
| 42 | " | $C_3H_7$ | $K \xrightarrow{79} I$ ; $S_A$ |

$S_1$ ... unidentified phase.

TABLE 5

| Example No. | Tilt angle* | Example No. | Tilt angle* |
|---|---|---|---|
| 1 | 42° | 18 | 38° |
| 2 | 37° | 26 | 17° |
| 3 | 35° | 27 | 21° |
| 4 | 37° | 28 | 25° |
| 5 | 36° | 29 | 20° |
| 15 | 38° | 30 | 17° |
| 16 | 35° | | |

*Tilt angle: T − Tc = −5° C.

TABLE 6

| No. | Composition (mol. %) | | Tilt angle | Contrast ratio |
|---|---|---|---|---|
| Comp. Example | 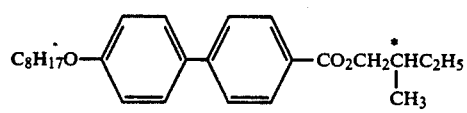 | (50) (50) | 22° | 1:3 |
| Example 46 | Composition of Comp. Example shown above 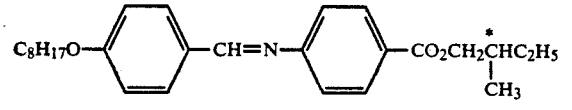 | (80) (20) | 28° | 1:5 |
| 47 | Composition of Comp. Example | (80) | 29° | 1:5 |

TABLE 6-continued

| No. | Composition (mol. %) | | Tilt angle | Contrast ratio |
|---|---|---|---|---|
| | 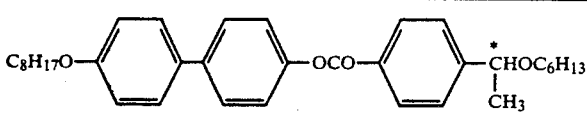 | (20) | | |
| 48 | Composition of Comp. Example | (70) | 30° | 1:6 |
| | 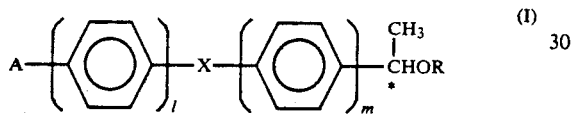 | (30) | | |
| 49 | Composition of Comp. Example | (60) | 30° | 1:6 |
| | 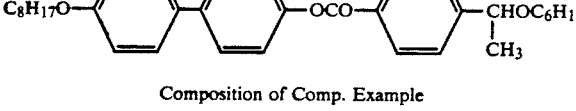 | (40) | | |

We claim:

1. Optically active ether derivatives represented by the formula (I):

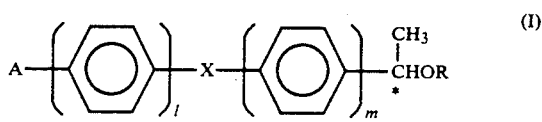

wherein X represents —COO— or —OCO—; A represents an alkyl or alkoxyl group having 6 to 15 carbon atoms; R represents an alkyl or alkoxyalkyl group having 1 to 20 carbon atoms; l and m each represents the number of 1 to 2 provided that the sum of l and m is 2 or 3; and * indicates an asymmetric carbon atom.

2. Optically active ether derivatives according to claim 1, wherein X is —COO—.

3. The optically active ether derivatives according to claim 2, where l is 2 and m is 1.

4. The optically active ether derivatives according to claim 1, wherein X is —OCO—.

5. The optically active ether derivatives according to claim 1, wherein R is an optically active group.

6. A liquid crystal composition having at least two components at least one of which is an optically active ether derivative represented by the formula (I):

$$A\text{-}(\bigcirc)_l\text{-}X\text{-}(\bigcirc)_m\text{-}\underset{*}{C}H(CH_3)OR \quad (I)$$

wherein X represents —COO— or —OCO—; A represents an alkyl or alkoxyl group having 6 to 15 carbon atoms; R represents an alkyl or alkoxyalkyl group having 1 to 20 carbon atoms; l and m each represents the number of 1 to 2, provided that the sum of l and m is 2 or 3; and * indicates an asymmetric carbon atom.

7. The liquid crystal composition according to claim 6, wherein R in the formula (I) representing the optically active ether derivative is an optically active group.

8. A light switching element employing a liquid crystal composition according to claim 6 as a liquid crystal material.

9. The light switching element according to claim 8, wherein R in the formula (I) representing optically active ether derivative is an optically active group.

* * * * *